(12) United States Patent
Heshmati et al.

(10) Patent No.: US 12,524,070 B2
(45) Date of Patent: Jan. 13, 2026

(54) GAZE TRACKING FOR A RETINAL PROJECTION DISPLAY SYSTEM

(71) Applicant: TDK CORPORATION, Tokyo (JP)

(72) Inventors: Ardalan Heshmati, Saratoga, CA (US); Hideaki Fukuzawa, Kanagawa (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 18/660,696

(22) Filed: May 10, 2024

(65) Prior Publication Data

US 2024/0288937 A1  Aug. 29, 2024

Related U.S. Application Data

(63) Continuation of application No. 17/822,619, filed on Aug. 26, 2022, now Pat. No. 12,019,797.

(60) Provisional application No. 63/239,915, filed on Sep. 1, 2021.

(51) Int. Cl.

| G09G 5/00 | (2006.01) |
|---|---|
| G02B 26/08 | (2006.01) |
| G02B 26/10 | (2006.01) |
| G02B 27/01 | (2006.01) |
| G06F 3/01 | (2006.01) |

(52) U.S. Cl.
CPC ......... *G06F 3/013* (2013.01); *G02B 26/0833* (2013.01); *G02B 26/105* (2013.01); *G02B 27/0172* (2013.01); *G02B 27/0179* (2013.01); *G02B 2027/0178* (2013.01); *G02B 2027/0187* (2013.01)

(58) Field of Classification Search
CPC ... G06F 3/013; G02B 26/0833; G02B 26/105; G02B 27/0172; G02B 27/0179; G02B 27/0093; G02B 2027/0178; G02B 2027/0187

See application file for complete search history.

(56) References Cited

U.S. PATENT DOCUMENTS

| 9,625,723 | B2 * | 4/2017 | Lou | G06F 3/013 |
|---|---|---|---|---|
| 10,303,940 | B2 * | 5/2019 | Zhang | G06V 40/193 |
| 10,542,596 | B1 | 1/2020 | Talati et al. | |
| 11,187,906 | B2 * | 11/2021 | Watola | G02B 27/0172 |

(Continued)

FOREIGN PATENT DOCUMENTS

WO  2023034752 A1  3/2023

OTHER PUBLICATIONS

ISA/EP, Search Report for International Application No. PCT/US2022/075597, 11 pages, Dec. 13, 2022.

*Primary Examiner* — Joe H Cheng

(57) ABSTRACT

A retinal projection display system includes at least one visible light source for projecting a visible light image, an infrared light source for projecting infrared light, a scanning mirror having a field of view larger than the visible light image, a reflective surface on which the visible light image is projected and on which the infrared light is reflected at least partially towards an eye of a user, wherein the reflective surface is larger than the visible light image, at least one infrared photodetector for receiving reflected infrared light that reflects off of the eye of the user, and a hardware computation module comprising a processor and a memory, the hardware computation module configured to determine a gaze direction of the user based at least in part on the reflected infrared light.

21 Claims, 17 Drawing Sheets

(56) References Cited

U.S. PATENT DOCUMENTS

| | | | |
|---|---|---|---|
| 11,416,074 B1 | 8/2022 | Trincia | |
| 12,019,797 B2* | 6/2024 | Heshmati | G02B 27/0093 |
| 12,023,106 B2* | 7/2024 | Govari | A61B 90/361 |
| 2002/0030637 A1* | 3/2002 | Mann | G06F 3/0386 |
| | | | 345/8 |
| 2007/0159599 A1* | 7/2007 | Yamada | A61B 3/113 |
| | | | 351/211 |
| 2014/0361957 A1* | 12/2014 | Hua | G02B 27/0172 |
| | | | 345/8 |
| 2015/0009313 A1 | 1/2015 | Noda et al. | |
| 2015/0261291 A1 | 9/2015 | Mikhailov et al. | |
| 2015/0378161 A1 | 12/2015 | Bailey et al. | |
| 2016/0349516 A1 | 12/2016 | Alexander et al. | |
| 2017/0148215 A1* | 5/2017 | Aksoy | G02B 27/017 |
| 2017/0285343 A1 | 10/2017 | Belenkii et al. | |
| 2018/0129041 A1 | 5/2018 | Aleem et al. | |
| 2020/0183155 A1 | 6/2020 | Xie et al. | |
| 2021/0263342 A1 | 8/2021 | Ouderkirk et al. | |
| 2023/0068608 A1 | 3/2023 | Heshmati et al. | |

* cited by examiner

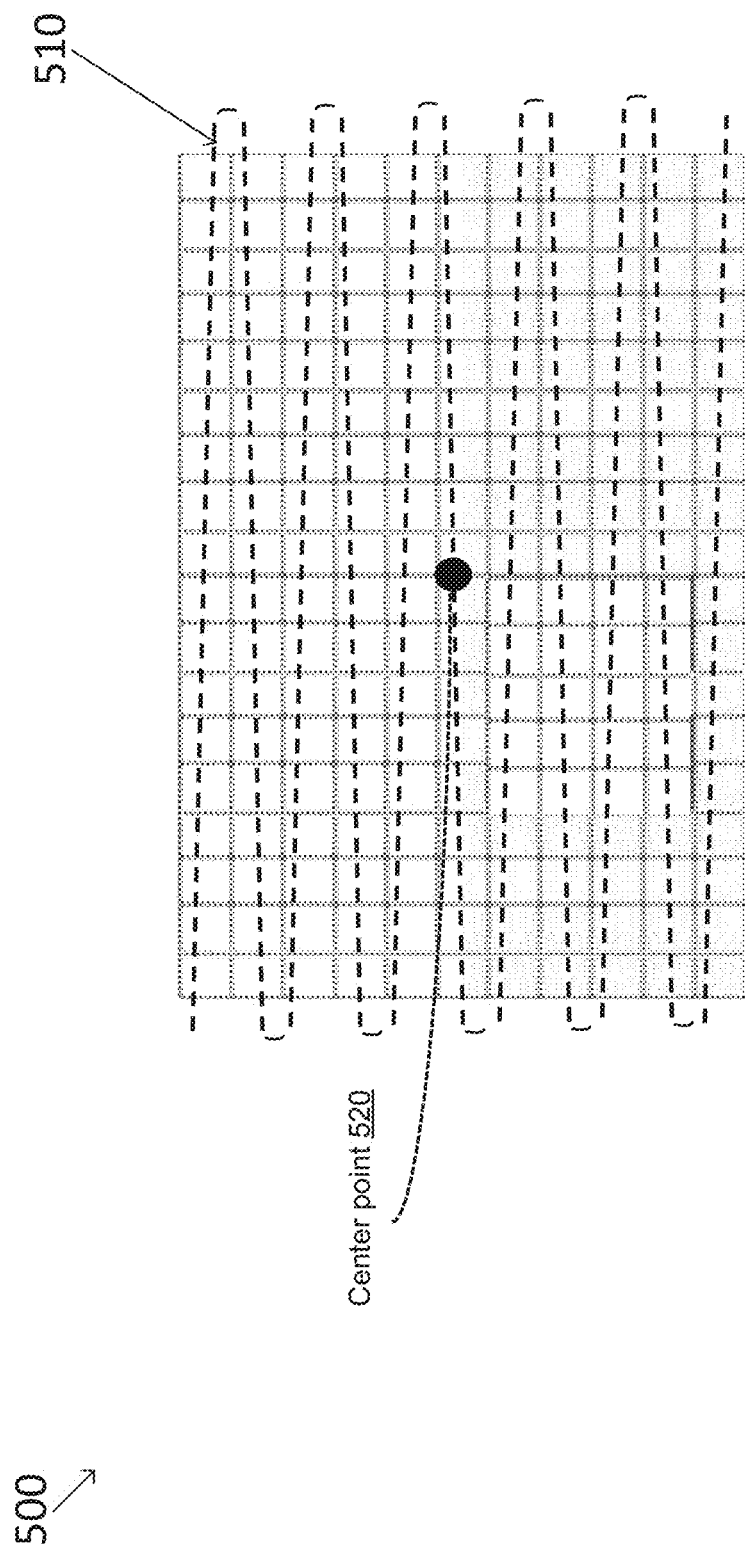

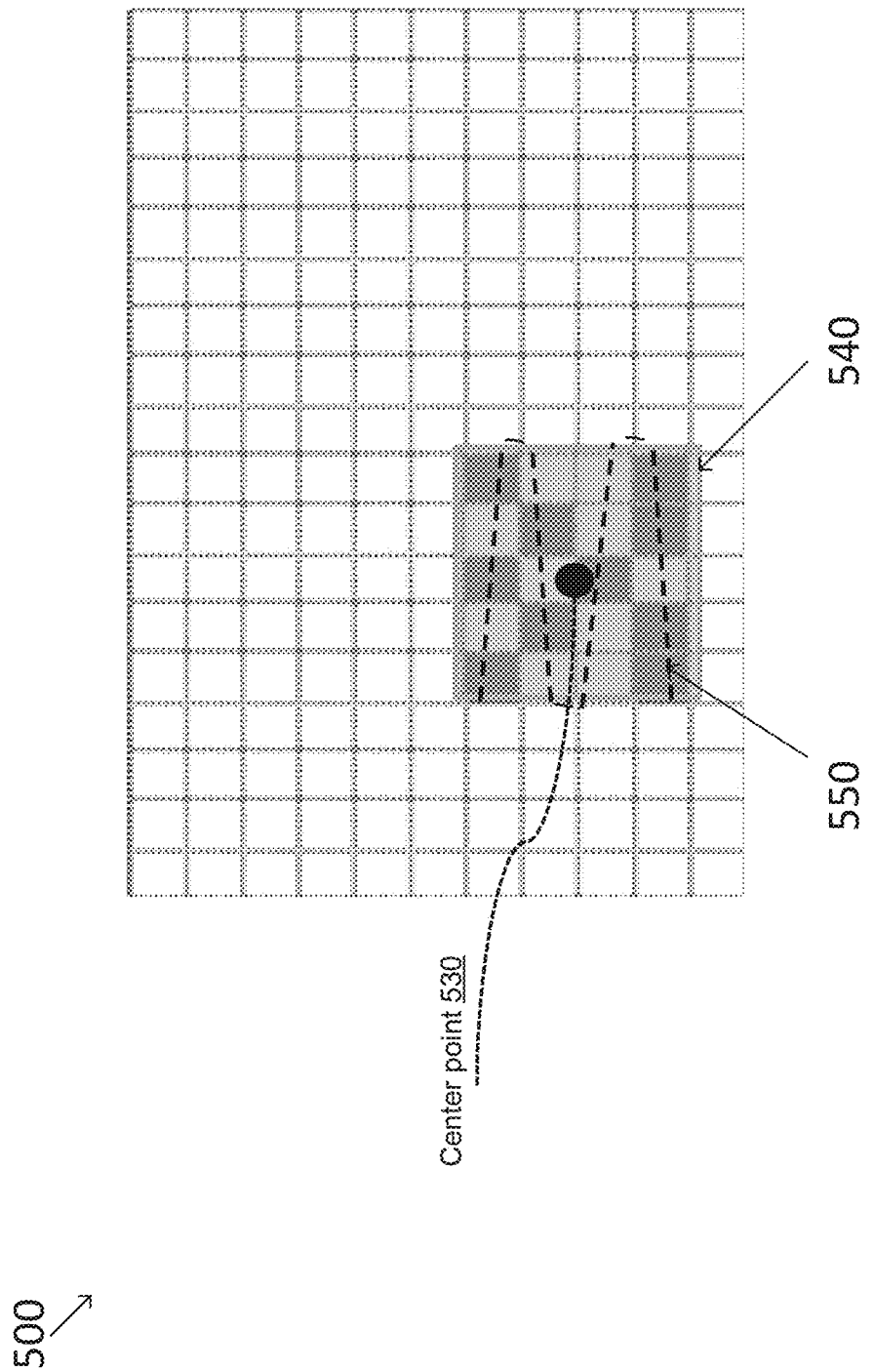

GAZE TRACKING FOR A RETINAL PROJECTION DISPLAY SYSTEM

RELATED APPLICATION

This application claims priority to and the benefit of co-pending U.S. patent application Ser. No. 17/822,619, filed on Aug. 26, 2022, now U.S. Pat. No. 12,019,797 entitled "GAZE TRACKING FOR A RETINAL PROJECTION DISPLAY SYSTEM," by Heshmati, et al., and assigned to the assignee of the present application, which is incorporated herein by reference in its entirety.

Co-pending U.S. patent application Ser. No. 17/822,619 claims priority to and the benefit of U.S. Provisional Patent Application No. 63/239,915, filed on Sep. 1, 2021, entitled "ADAPTIVE EYE-BOX WITH IR LASER IN AR SMART GLASSES," by Heshmati, et al., and assigned to the assignee of the present application, which is incorporated herein by reference in its entirety.

BACKGROUND

Retinal projection displays (RPDs), also referred to as virtual retinal displays (VRD), are used to project images through the pupil of an eye directly onto the retina. The image rendering is performed fast enough such that the human eye perceives a continuous video stream of images. As the area through which the images are projected through the pupil and onto the retina, also referred to as the "eye box," is small, it is essential to have precise alignment between the RPD and the eye to ensure that the image enters the eye. Furthermore, as the gaze direction of a user can change during usage of an RPD, thus changing the location of the eye box, it is necessary to account for the change in gaze direction during usage of the RPD.

BRIEF DESCRIPTION OF THE DRAWINGS

The accompanying drawings, which are incorporated in and form a part of the Description of Embodiments, illustrate various non-limiting and non-exhaustive embodiments of the subject matter and, together with the Description of Embodiments, serve to explain principles of the subject matter discussed below. Unless specifically noted, the drawings referred to in this Brief Description of Drawings should be understood as not being drawn to scale and like reference numerals refer to like parts throughout the various figures unless otherwise specified.

FIG. 5A illustrates an example scanning pattern over the full scanning range of the scanning mirror, according to an embodiment.

FIG. 5B illustrates an example scanning pattern where the scanning range of the scanning mirror is the size of the projected image.

DESCRIPTION OF EMBODIMENTS

Figure 1A:
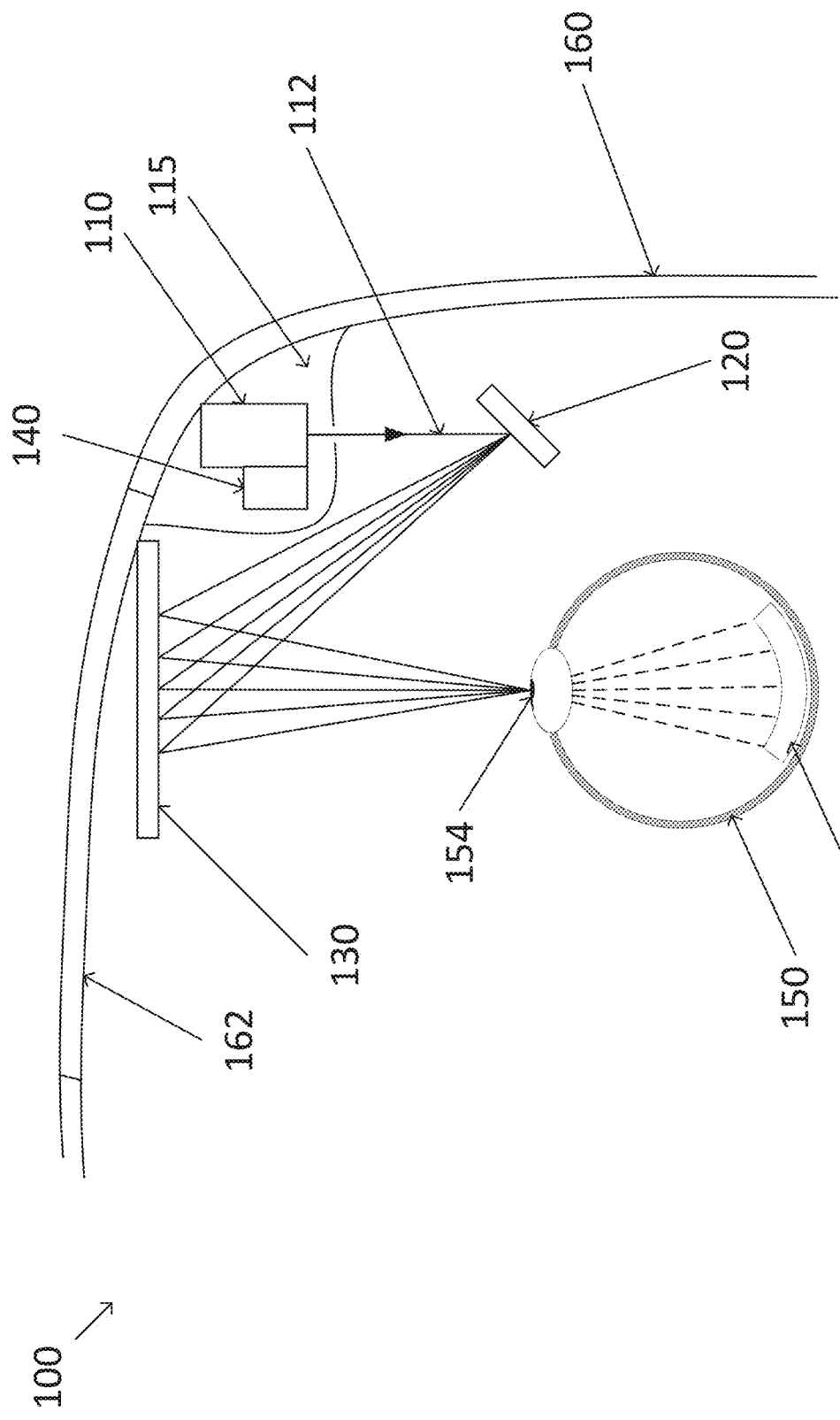
FIG. 1A illustrates an example retinal projection display system, according to some embodiments.

The following Description of Embodiments is merely provided by way of example and not of limitation. Furthermore, there is no intention to be bound by any expressed or implied theory presented in the preceding background or in the following Description of Embodiments.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data within an electrical device. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of acoustic (e.g., ultrasonic) signals capable of being transmitted and received by an electronic device and/or electrical or magnetic signals capable of being stored, transferred, combined, compared, and otherwise manipulated in an electrical device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "performing," "determining," "detecting," "directing," "calculating," "correcting," "providing," "receiving," "analyzing," "confirming," "displaying," "presenting," "using," "completing," "instructing," "comparing," "executing," "tracking," "moving," "retrieving," "projecting," "calibrating," "coordinating," "generating," "aligning," "measuring," "mapping," or the like, refer to the actions and processes of an electronic device such as an electrical device.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, logic, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example ultrasonic sensing system and/or mobile electronic device described herein may include components other than those shown, including well-known components.

Various techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

Various embodiments described herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), a programmable logic controller (PLC), a complex programmable logic device (CPLD), a discrete gate or transistor logic, discrete hardware components, or any combination thereof designed to perform the functions described herein, or other equivalent integrated or discrete logic circuitry. The term "processor," as used herein may refer to any of the foregoing structures or any other structure suitable for implementation of the techniques described herein. As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Moreover, processors can exploit nano-scale architectures such as, but not limited to, molecular and quantum-dot based transistors, switches and gates, in order to optimize space usage or enhance performance of user equipment. A processor may also be implemented as a combination of computing processing units.

In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Discussion begins with a description of an example retinal projection display system. Discussion continues with a description of a system of gaze tracking for a retinal projection display system. Example operations of a retinal projection display system and gaze tracking system are then described.

Embodiments described herein provide a retinal projection display system including at least one visible light source for projecting a visible light image, an infrared light source for projecting infrared light, a scanning mirror having a field of view larger than the visible light image, a reflective surface on which the visible light image is projected and on which the infrared light is reflected at least partially towards an eye of a user, where the reflective surface is larger than the visible light image, at least one infrared photodetector for receiving reflected infrared light that reflects off of the eye of the user, and a hardware computation module comprising a processor and a memory, the hardware computation module configured to determine a gaze direction of the user based at least in part on the reflected infrared light.

In some embodiments, the reflective surface is at least partially transparent. In some embodiments, the retinal projection system further includes an eyeglasses frame configured to be worn by the user and at least one lens mounted in the eyeglasses frame, where the reflective surface is positioned on at least a portion of the at least one lens. In some embodiments, the at least one infrared photodetector is positioned on the eyeglasses frame. In some embodiments, the at least one infrared photodetector is positioned inside a module comprising the at least one visible light source and the infrared light source.

In some embodiments, the hardware computation module is further configured to scan the infrared light over the field of view of the reflective surface. Reflected infrared light that reflects off of the eye of the user is received at the at least one infrared photodetector. An amount of the reflected infrared light over the field of view of the scanning mirror on the reflective surface is measured. The amount of the reflected infrared light over the field of view of the scanning mirror on the reflective surface is mapped to generate an infrared reflectivity map of the field of view of the scanning mirror, where the infrared reflectivity map identifies the gaze direction.

In some embodiments, the hardware computation module is further configured to coordinate operation of scanning mirror and the at least one visible light source for projecting the visible light image onto the reflective surface based on the gaze direction such that the visible light image is projected into a retina of the user. In some embodiments, the at least one visible light source and the infrared light source are in alignment, such that the hardware computation module is further configured to control the scanning mirror to project the visible light image onto the reflective surface toward the gaze direction. In other embodiments, the at least one visible light source and the infrared light source are not in alignment, such that the hardware computation module is further configured to control the scanning mirror to compensate for displacement between the at least one visible light source and the infrared light source to determine the gaze direction and to project the visible light image onto the reflective surface toward the gaze direction. In some embodiments, a pupillary distance alignment is determined during a calibration operation for the user, where the pupillary distance alignment identifies a viewable region of the reflective surface for a known gaze direction of the user. In some embodiments, the displacement between the at least one visible light source and the infrared light source is based at least in part on the gaze direction and the pupillary distance alignment. In some embodiments, the displacement between the at least one visible light source and the infrared light source is determined during a manufacturing calibration operation and stored in the memory.

In some embodiments, the at least one visible light source comprises a plurality of visible light sources, and where a visible light source displacement between the plurality of visible light sources is determined during a manufacturing calibration operation and stored in the memory. In some embodiments, the hardware computation module is configured to align the plurality of visible light sources based at least in part on the visible light source displacement.

Other embodiments described herein provide a method of retinal projection. A visible light image is projected from at least one visible light source onto a reflective surface using a scanning mirror having a field of view larger than the visible light image, where the reflective surface is larger than the visible light image. Infrared light from an infrared light source is projected onto the reflective surface using the scanning mirror, where the infrared light is projected over the field of view of the scanning mirror and reflected off the reflective surface at least partially towards an eye of a user. Reflected infrared light that reflects off of the eye of the user is received at at least one infrared photodetector. A gaze direction of the user is determined based at least in part on the reflected infrared light.

In some embodiment, operation of the scanning mirror and the at least one visible light source is coordinated for projecting the visible light image onto the reflective surface based on the gaze direction such that the visible light image is projected into a retina of the user. In some embodiments, where the at least one visible light source and the infrared light source are in alignment, scanning mirror is controlled to project the visible light image onto the reflective surface toward the gaze direction. In other embodiments, where the at least one visible light source and the infrared light source are not in alignment, displacement between the at least one visible light source and the infrared light source is determined. The scanning mirror is controlled to compensate for the displacement between the at least one visible light source and the infrared light source to determine the gaze direction and to project the visible light image onto the reflective surface toward the gaze direction.

In some embodiments, the determining the displacement between the at least one visible light source and the infrared light source includes retrieving a pupillary distance alignment for the user, where the pupillary distance alignment identifies a viewable region of the reflective surface for a known gaze direction of the user, and where the displacement between the at least one visible light source and the infrared light source is based at least in part on the gaze direction and the pupillary distance alignment. In other embodiments, determining the displacement between the at least one visible light source and the infrared light source includes retrieving the displacement between the at least one visible light source and the infrared light source, where the displacement between the at least one visible light source and the infrared light source is determined during a manufacturing calibration operation and stored in a memory unit.

In some embodiments, at least one visible light source comprises a plurality of visible light sources, and where a visible light source displacement between the plurality of visible light sources is determined during a manufacturing calibration operation and stored in a memory unit. In some embodiments, the plurality of visible light sources are aligned based at least in part on the visible light source displacement.

In some embodiments, determining the gaze direction of the user based at least in part on the reflected infrared light includes measuring an amount of the reflected infrared light over the field of view of the scanning mirror on the reflective surface. The amount of the reflected infrared light over the field of view of the scanning mirror on the reflective surface is mapped to generate an infrared reflectivity map of the field of view of the scanning mirror, where the infrared reflectivity map identifies the gaze direction.

Example Retinal Projection Display System

FIG. 1A illustrates an example retinal projection display system 100, according to some embodiments. Retinal projection display system 100 includes light source 110, scanning mirror 120, and reflective surface 130. In the illustrated embodiment, the components of retinal projection display system 100 are comprised within eyeglasses frame 160 that is configured to be worn by a user. Eyeglasses frame 160 includes at least one lens 162 mounted therein, where reflective surface 130 is positioned on or in front of at least a portion of lens 162 such that reflective surface 130 is within view of the user when gazing through lens 162. It should be appreciated that reflective surface 130 may be located on lens 162 (e.g., a film or an affixed layer) or otherwise positioned between the user's eye and lens 162. In some embodiments, reflective surface 130 is at least partially transparent, allowing the user to view through reflective surface 130 and lens 162. It should be appreciated that various components of retinal projection display system 100, such as light source 110 and scanning mirror 120, can be disposed on or within cavities eyeglasses frame 160 (e.g., within a cavity 115 of an arm/temple) and positioned such that light beam 112 is projected onto reflective surface 130.

During operation, light source 110 (e.g., a laser) projects an image onto a portion of reflective surface 130 by generating light beam 112 that is projected onto scanning mirror 120. In some embodiments, light source 110 is a single light source capable of projecting a complete image. In some embodiments, light source 110 include multiple light sources such as separate red, green, and blue (RGB) lasers that operate in coordination to project a complete image. It should be appreciated that many types of light sources can be used in accordance with the described embodiments.

Scanning mirror 120 is configured to move and direct light beam 112 such that it is scanned over reflective surface 130 to place each point of the image onto reflective surface 130, which directs light beam 112 through the user's pupil 154 of eye 150 and onto retina 152. It should be appreciated that a variety of scanning patterns can be used, as described below. It should be appreciated that the image scanning process is performed at a scanning rate fast enough (e.g., greater than 60 Hz) such that the user perceives the entire image, or as a continuous video of images. In some embodiments, scanning mirror 120 is a microelectromechanical (MEMS) device.

Scanning mirror 120 has a field of view (FOV) larger than the size of the intended viewable image and reflective surface 130 into which the viewable image is projected is also larger than the intended viewable image. Scanning mirror 120 projects the image onto a viewable region of reflective surface 130 such that the image is projected onto retina 152 of the user. The larger FOV allows for retinal projection display system 100 to properly project the image into pupil 154 and onto retina 152 independent of the movement and rotation of eye 150. In accordance with some embodiments, retinal projection display system 100 facilitate projecting the intended viewable image to align with pupil 154 by projecting over a viewable region of reflective surface 130 over a window of scanning mirror dynamic range.

A pupillary distance alignment is used to direct light beam 112 into pupil 154 of eye 150, where the pupillary distance alignment identifies the viewable region of reflective surface 130 for a known gaze direction of the user. In some embodiments, the pupillary distance alignment is determined during a calibration operation for the user. In some embodiments, the image is displayed at multiple locations of reflective surface 130 during the calibration operation, and the pupillary distance alignment is determined responsive to feedback from the user identifying the viewable region of the reflective surface. For example, the user feedback can be provided using a user interface of retinal projection display system 100, and can be received in many ways, e.g., voice commands, buttons located on eyeglasses frame 160, an application on a connected device such as a smart phone, etc.

In some embodiments, retinal projection display system 100 also includes gaze tracker 140 for tracking a gaze direction of the user. The viewable region of reflective surface 130 corresponds to the gaze direction of the user. Scanning mirror 120 is configured to dynamically move the image on reflective surface 130 according to the gaze direction of the user and the pupillary distance alignment of the user. Since the pupillary distance alignment for the user identifies the viewable region of reflective surface 130 for a known gaze direction of the user, scanning mirror 120 can move the image to correspond to the viewable region of reflective surface according to the gaze direction.

In accordance with some embodiments, gaze tracker 140 of retinal projection display system 100 utilizes an infrared light source and at least one infrared sensor (e.g., an infrared photodetector) for determining the gaze direction of the user. To perform the gaze tracking of the described embodiments, infrared light is projected onto the eye of the user and the reflected infrared light is sensed and used to determine the gaze direction. It should be appreciated that different parts of the human eye have different reflectivity to infrared light. For instance, the pupil of the human eye has very little reflectivity to infrared light, as most infrared light is absorbed into the inner eye. The sclera, which is the white part that covers most of the outside of a human eyeball is highly reflective relative the reflectivity of the pupil, with most infrared light being reflected off of the sclera. The iris, which is the part of the eye that surrounds the pupil and defines the color of an eye, is more reflective than the pupil and less reflective than the sclera, with reflectivity in part depending on the eye color of the iris.

Figure 1B:
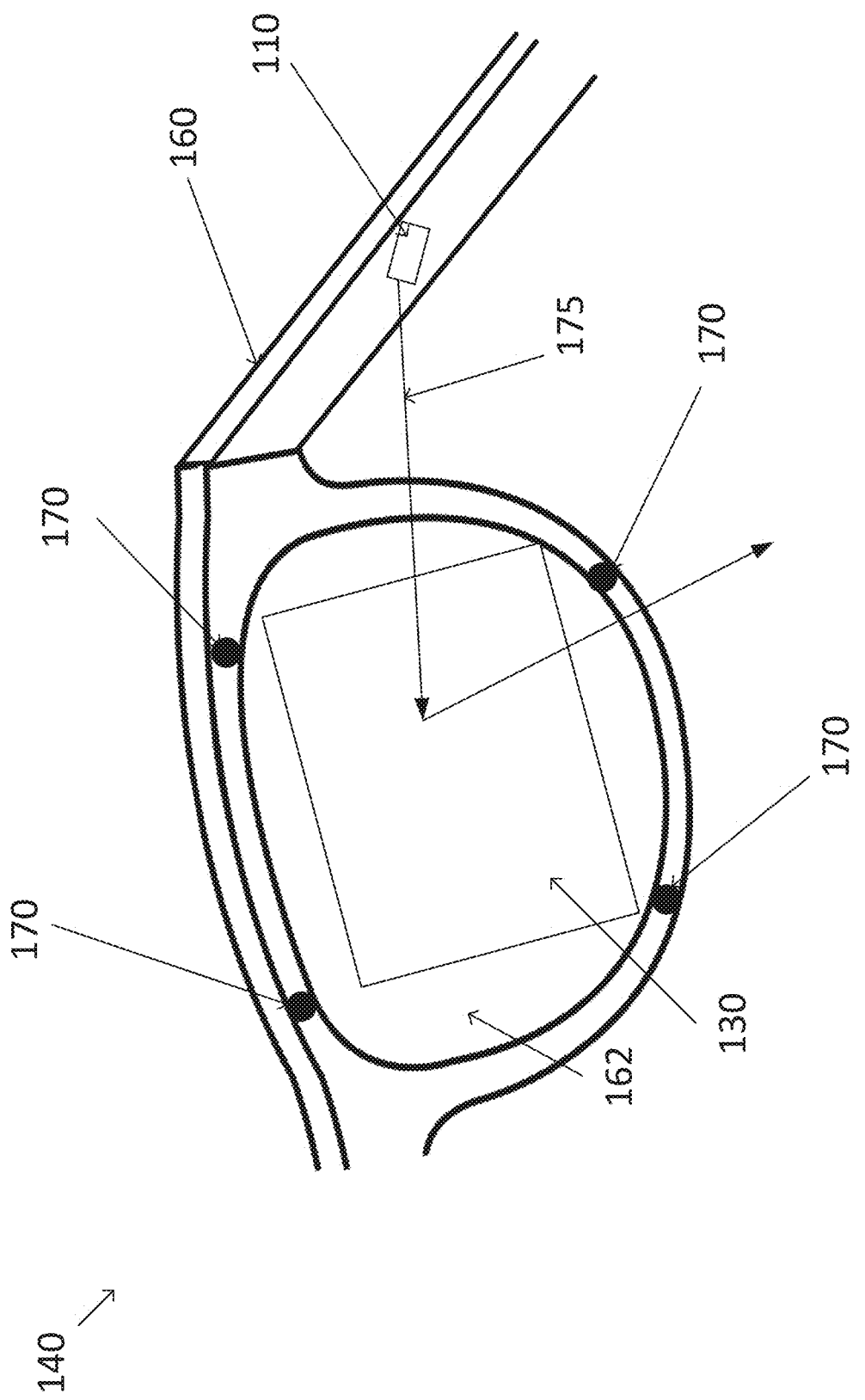
FIG. 1B illustrates an example gaze tracking system including infrared sensors located on an eyeglasses frame, according to some embodiments.

The gaze tracking of the described embodiments utilizes the properties of reflectivity of parts of the outer eye anatomy to identify the gaze direction of the user. FIG. 1B illustrates an example gaze tracking system 140 including infrared sensors 170 located on an eyeglasses frame 160, according to some embodiments. As illustrated in FIG. 1B, a plurality of infrared sensors 170 are located at different positions on eyeglasses frame 160 positioned around lens 162. In the illustrated embodiment, light source 110 includes an infrared light source and projects infrared light onto reflective surface 130 (as shown by arrow 175) using scanning mirror 120. The infrared light reflects off of the external parts of the user's eyeball and is received at infrared sensors 170. The infrared light received at infrared sensors 170 is used to determine the gaze direction of the user.

Figure 1C:
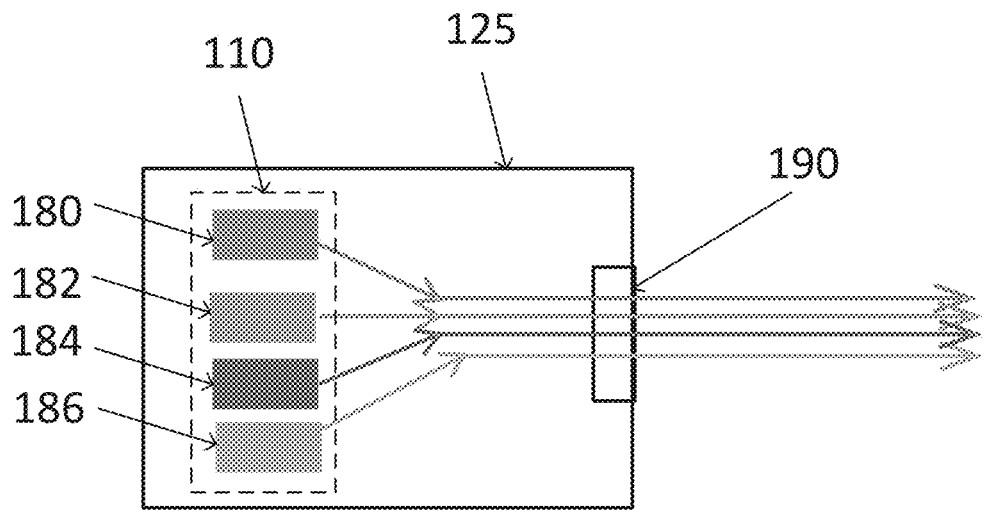
FIG. 1C illustrates an example light source module including an infrared light source for use in gaze tracking, according to embodiments.

FIG. 1C illustrates an example light source module 125 including an infrared light source 186 for use in gaze tracking, according to embodiments. In some embodiments, light source module 125 is positioned on eyeglasses frame 160 such that light emitted through aperture 190 is projected onto reflective surface 130 using scanning mirror 120. As illustrated, light source 110 includes multiple light sources including separate red light source 180, green light source 182, blue light source 184, and infrared light source 186. In some embodiments, red light source 180, green light source 182, and blue light source 184 are lasers that operate in coordination to project a complete red, green, and blue (RGB) image. Infrared light source 184 is configured to project infrared light through aperture 190 and onto reflective surface 130 via scanning mirror 120 for projection onto the user's eye. In some embodiments, light source module 125 is disposed within cavity 115.

The embodiments of FIGS. 1B and 1C illustrate an example gaze tracking system 140 in which infrared light sensors 170 are positioned around reflective surface 130 for directly receiving infrared light that reflects off of the user's eye. In other embodiments, one or more infrared light sensors can be positioned for indirectly receiving the infrared light that reflects off of the user's eye.

Figure 1D:
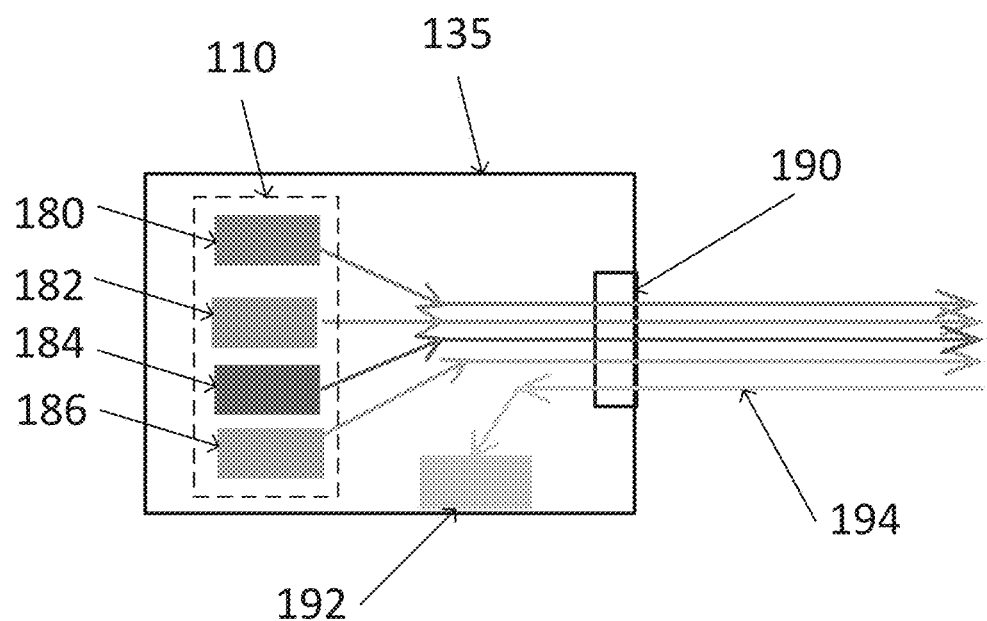
FIG. 1D illustrates an example light source module including an infrared light source for use in gaze tracking and an internal infrared sensor, according to embodiments.

FIG. 1D illustrates an example light source module 135 including an infrared light source 186 for use in gaze tracking and an internal infrared sensor 192, according to embodiments. In some embodiments, light source module 135 is positioned on eyeglasses frame 160 such that light emitted through aperture 190 is projected onto reflective surface 130 using scanning mirror 120. As illustrated, light source 110 includes multiple light sources including separate red light source 180, green light source 182, blue light source 184, and infrared light source 186. In some embodiments, red light source 180, green light source 182, and blue light source 184 are lasers that operate in coordination to project a complete red, green, and blue (RGB) image. Infrared light source 184 is configured to project infrared light through aperture 190 and onto reflective surface 130 via scanning mirror 120 for projection onto the user's eye. In some embodiments, light source module 135 is disposed within cavity 115.

Light source module 135 also includes internal infrared sensor 192 for receiving infrared light that reflects off of parts of the user's eye and through aperture 194. In some embodiments, the infrared light that reflects off of parts of the user's eye also reflects off of reflective surface 130 and/or scanning mirror 120, and is directed through aperture 194 for receipt at infrared sensor 192. The infrared light received at infrared sensor 192 is used to determine the gaze direction of the user.

In some embodiments, to avoid jitter of the viewable image, scanning mirror 120 is configured to dynamically move the image on reflective surface 130 according to the gaze direction of the user responsive to the gaze direction satisfying a movement threshold. For instance, scanning mirror 120 only moves the image on reflective surface if sufficient movement of the gaze direction is detected. In some embodiments, jitter is accounted for by providing a rendered image smaller than the viewable region of reflective surface 130 such that scanning mirror 120 is configured to dynamically move the image on reflective surface 130 according to the gaze direction of the user responsive to image moving outside of the viewable region. This allows the image to be viewed over a larger range of positions on reflective surface 130 and minimizes jitter.

In some embodiments, to avoid image smearing, scanning mirror 120 is configured to dynamically move the image on reflective surface 130 according to the gaze direction of the user after a predetermined time delay after the change in gaze direction, allowing eye 150 to settle in the new gaze direction prior to moving the image.

In some embodiments, a scanning range of scanning mirror 120 is dynamically adjusted to correspond to a size of the image in the viewable region. In other embodiments, a scanning range of scanning mirror 120 corresponds to a size of a display area of reflective surface 130, such that light source 110 is activated for displaying the image only when scanning mirror 120 is projecting the image in the viewable region of reflective surface 130.

Figure 2A:
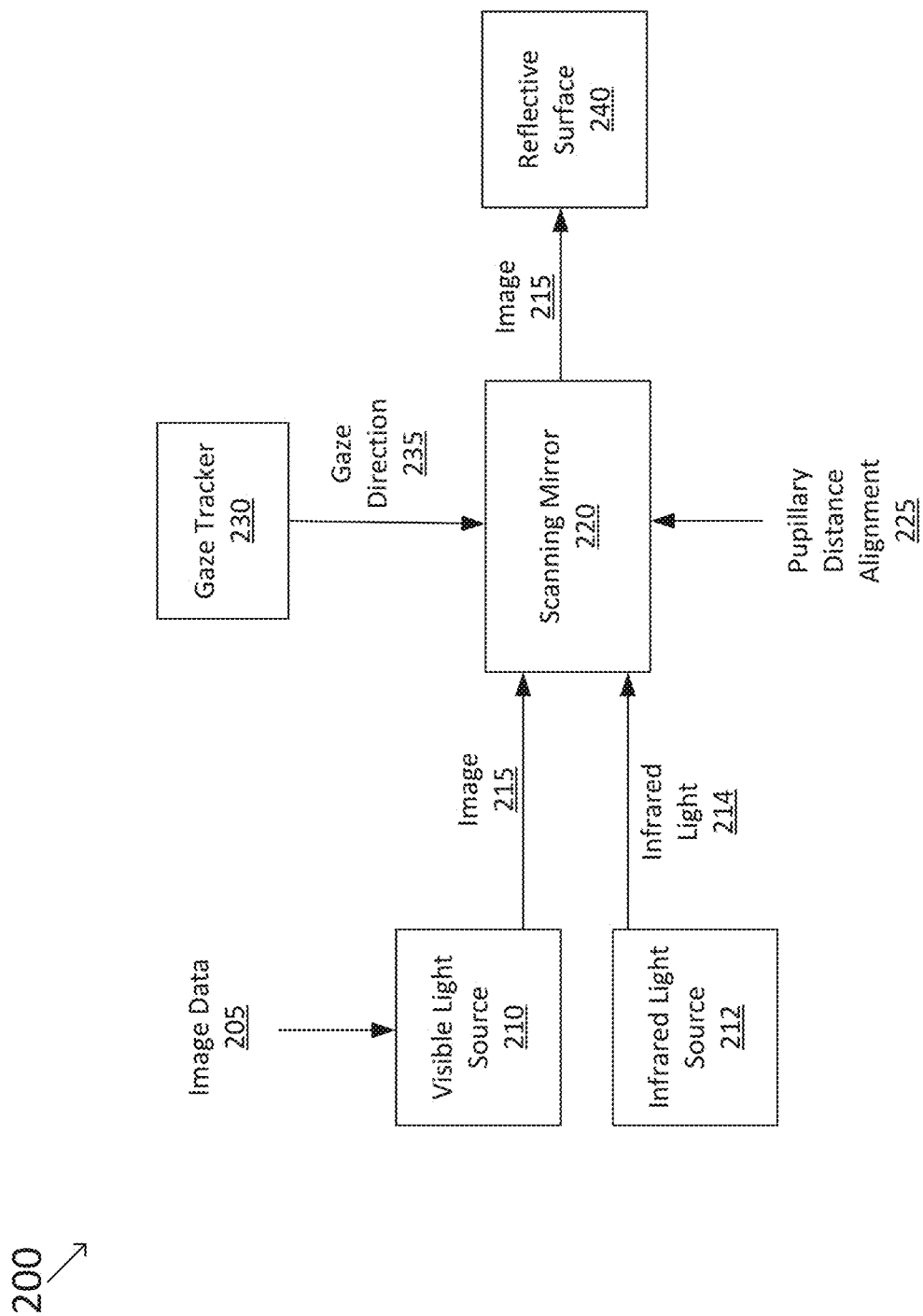
FIG. 2A illustrates a functional block diagram of an example retinal projection display system, according to some embodiments.

FIG. 2A illustrates a functional block diagram of an example retinal projection display system 200, according to some embodiments. Retinal projection display system 200 includes light source 210, infrared light source 212, scanning mirror 220, gaze tracker 230, and reflective surface 240. Light source 210 receives image data 205 from a data source for projection. It should be appreciated that image data 205 can include any type of data for displaying or rendering an image, including static image data, video data (e.g., a series of images), or other data for visualization by a user. In some embodiments, light source 210 is a single light source capable of projecting a complete image. In some embodiments, light source 210 include multiple light sources such as separate red, green, and blue (RGB) lasers that operate in coordination to project a complete image. It should be appreciated that many types of light sources can be used in accordance with the described embodiments.

Infrared light source 212 is configured to project infrared light 214 onto reflective surface 240 (e.g., via scanning mirror 220). It should be appreciated that infrared light source 212 can project infrared light 214 at different locations and using different scanning patterns than visible light source 210. In some embodiments, retinal projection display system 200 is configured to project infrared light 214 over an area larger than the viewable region of reflective surface 240 in which the visible light is projected. For instance, in some embodiments, infrared light 214 is projected over the entire surface of reflective surface 240. In some embodiments, light source 210 and infrared light source 212 are included within a single light source module.

Light source 210 (e.g., a laser) projects image 215 onto scanning mirror 220. It should be appreciated that image 215 is projected as a scan of pixels of image 215, where scanning mirror 220 dynamically moves to position each pixel at the proper location of reflective surface 240 for rendering. Scanning mirror 220 is configured to move and direct pixels of image 215 such that they are scanned over reflective surface 240 to place each point of the image onto reflective surface 240, which directs image 215 into the user's pupil and onto their retina. It should be appreciated that a variety of scanning patterns can be used, as described below. It should be appreciated that the image scanning process is performed at a scanning rate fast enough (e.g., greater than 60 Hz) such that the user perceives the entire image, or as a continuous video of images.

Scanning mirror 220 utilizes pupillary distance alignment 225 for the user and gaze direction 235 to control the position of pixels of image 215 such that they are directed onto the user's retina. The pupillary distance alignment identifies the viewable region of reflective surface 240 for a known gaze direction of the user.

Figure 3:
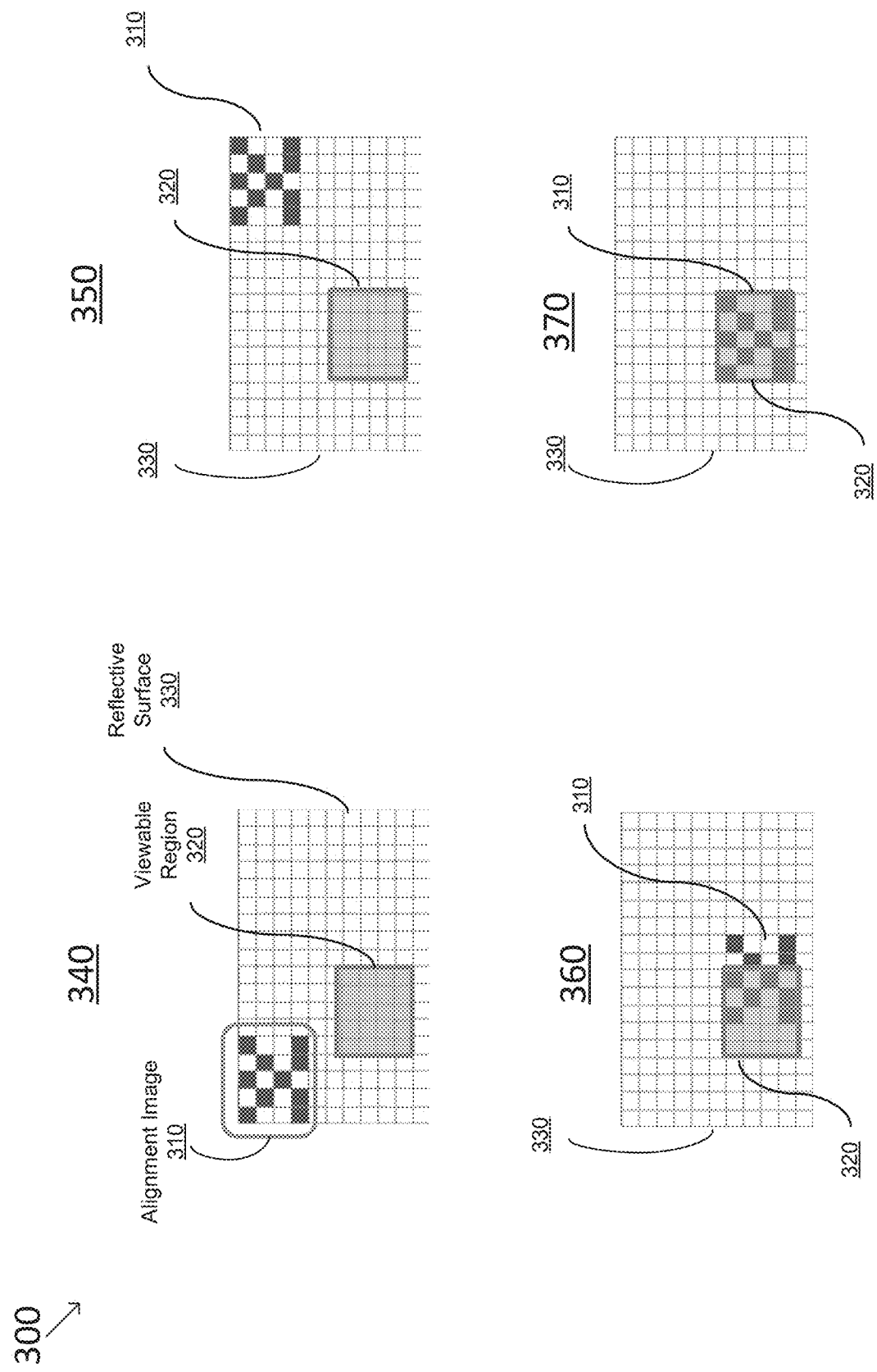
FIG. 3 illustrates an example pupillary distance alignment operation by projecting an alignment image onto a reflective surface, according to some embodiments.

FIG. 3 illustrates an example pupillary distance alignment operation 300 by projecting an alignment image onto a reflective surface, according to some embodiments. In some embodiments, pupillary distance alignment operation 300 is determined during a calibration operation for the user. In some embodiments, during pupillary distance alignment operation 300, alignment image 310 is displayed at multiple locations of reflective surface 330, and the pupillary distance alignment is determined responsive to feedback from the user identifying viewable region 320 of reflective surface 330. For example, the user feedback can be provided using a user interface of retinal projection display system 100, and can be received in many ways, e.g., voice commands, buttons located on eyeglasses frame 160, an application on a connected device such as a smart phone, etc.

During pupillary distance alignment operation 300, the user is instructed (e.g., via a user interface) to look in a particular direction (e.g., straight ahead). Alignment image 310 is rendered on reflective surface 330 and moved over the dynamic range of the scanning mirror to display alignment image at multiple locations on reflective surface 330. The user provides feedback (e.g., when prompted) as to whether alignment image 310 is fully visible, partially visible, or not visible. When alignment image 310 is within viewable region 320 and is visible to the user, e.g., partially or fully, the user provides feedback to indicate that alignment image 310 is visible. In some embodiments, alignment image 310 is adapted to help with alignment. For example, alignment image 310 may include information identifying portions of alignment image 310 such as characters, arrows, colors, or other indicators, that the user can use to indicate which part of alignment image 310 they see so that the retinal projection display system knows how to move alignment image 310 into viewable region 320.

As illustrated, alignment image 310 is projected onto reflective surface 330. In the illustrated example, at first time 340, alignment image 310 is not within the user's viewable region 320 of reflective surface 330 corresponding to the user's known gaze direction (e.g., straight forward). The user provides feedback that alignment image 310 is not visible to the user. At second time 350, alignment image 310 is moved to a different location of reflective surface 330 that is still not within viewable region 320. As illustrated, viewable region 320 is substantially static during pupillary distance alignment operation 300. The user provides feedback that alignment image 310 is not visible to the user.

At third time 360, alignment image 310 is moved to a different location of reflective surface 330 that is partially within viewable region 320. The user provides feedback that alignment image 310 is partially visible to the user. At fourth time 370, alignment image 310 is moved to a different location of reflective surface 330 that is fully within viewable region 320. The user provides feedback that alignment image 310 is fully visible to the user. The position of alignment image 310 at fourth time 370 is stored and used as the pupillary distance alignment for the user's known gaze direction (e.g., straight forward). The pupillary distance alignment is stored (e.g., within memory of the retinal projection display system).

With reference to FIG. 2A, gaze tracker 230 is for tracking gaze direction 235 of the user. The viewable region of reflective surface 240 corresponds to the gaze direction of the user such that as gaze direction 235 moves, the viewable region of the user on reflective surface 240 moves as well. Scanning mirror 220 is configured to dynamically move image 215 on reflective surface 240 according to gaze direction 235 of the user and pupillary distance alignment 225 of the user. Since pupillary distance alignment 225 for the user identifies the viewable region of reflective surface 240 for a known gaze direction of the user, scanning mirror 220 can move image 215 to correspond to the viewable region of reflective surface 240 according to gaze direction 235.

Figure 2B:
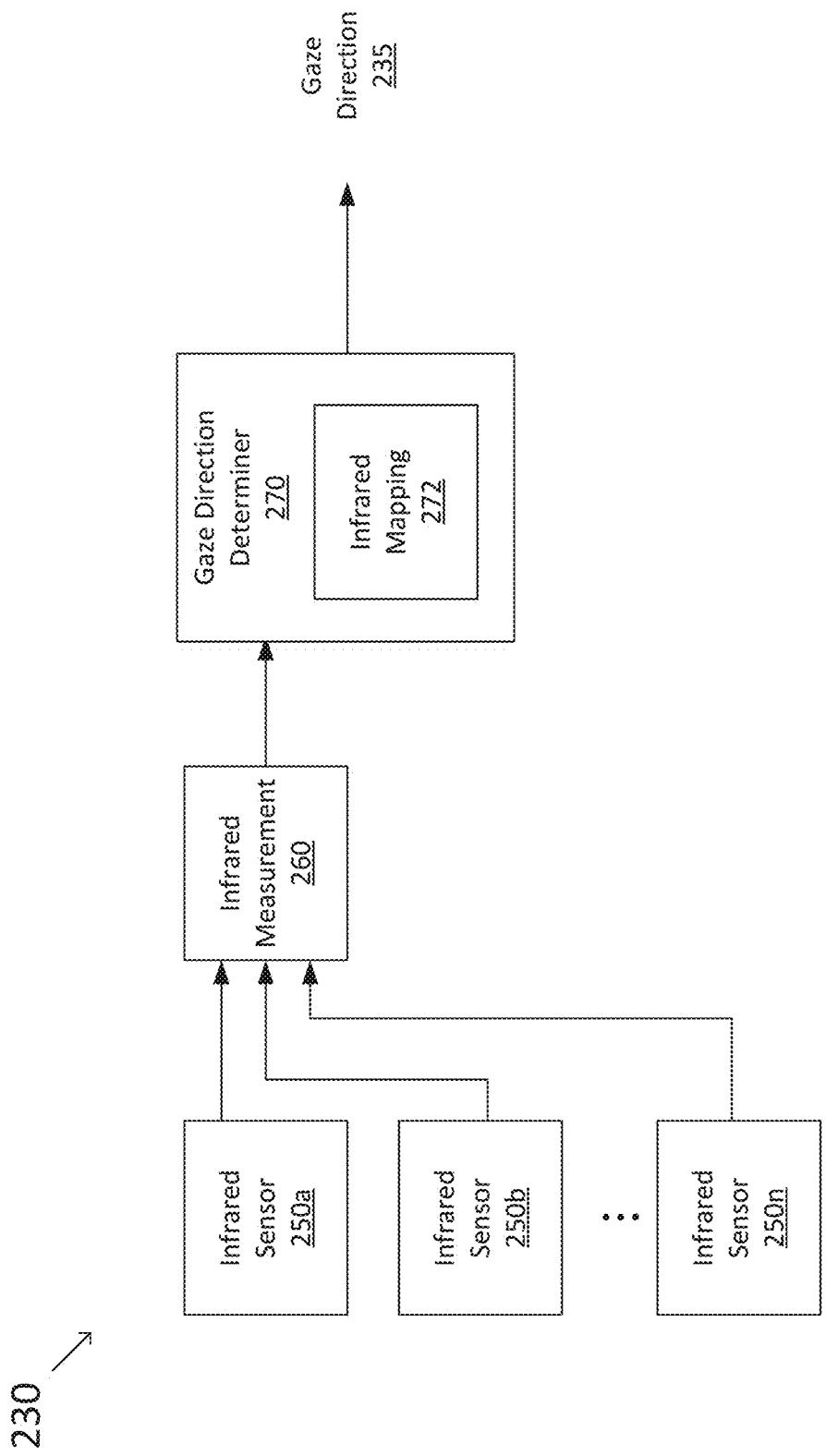
FIG. 2B illustrates a functional block diagram of an example gaze tracking system, according to some embodiments.

FIG. 2B illustrates a functional block diagram of an example gaze tracking system (e.g., gaze tracker 230), according to some embodiments. Gaze tracking system 230 includes one or more infrared sensors 250a-n, infrared measurement module 260, and gaze direction determiner 270. Infrared sensors 250a-n are configured to receive and sense infrared light. It should be appreciated that gaze tracking system 230 can include any number of infrared sensors 250a-n positioned for receiving infrared light reflected off of a user's eye. Infrared measurement module 260 receives the infrared light sensed at infrared sensors 250a-n and is configured to measure the amount of infrared light received at each infrared sensor 250a-n as the time of sensing. In some embodiments, infrared measurement module 260 is configured to measure the amount of infrared light over the field of view of scanning mirror 220 on reflective surface 240.

Gaze direction determiner 270 is configured to determine gaze direction 235 based on the amount of infrared light received at each infrared sensor 250a-n. In some embodiments, gaze direction determiner 270 includes infrared mapping module 272. Infrared mapping module 272 is configured to map the amount of the reflected infrared light over the field of view of scanning mirror 220 on reflective surface 240 to generate an infrared reflectivity map of the field of view of scanning mirror 220. The infrared reflectivity map identifies the gaze direction based on the intensity of the reflected infrared light sensed.

FIGS. 4A through 4D illustrate procedures in an example gaze tracking operation 400, according to some embodiments. During gaze tracking operation 400, a gaze tracker (e.g., gaze tracker 140 of FIG. 1A or gaze tracker 230 of FIG. 2A) is configured to track the gaze direction of the user. In some embodiments, gaze tracking operation 400 is performed concurrent to the projection of a visible image, allowing for the retinal projection display system to coordinate operation of the scanning mirror and the at least one visible light source for projecting the visible light image onto the reflective surface based on the gaze direction such that the visible light image is projected into a retina of the user.

Figure 4A:
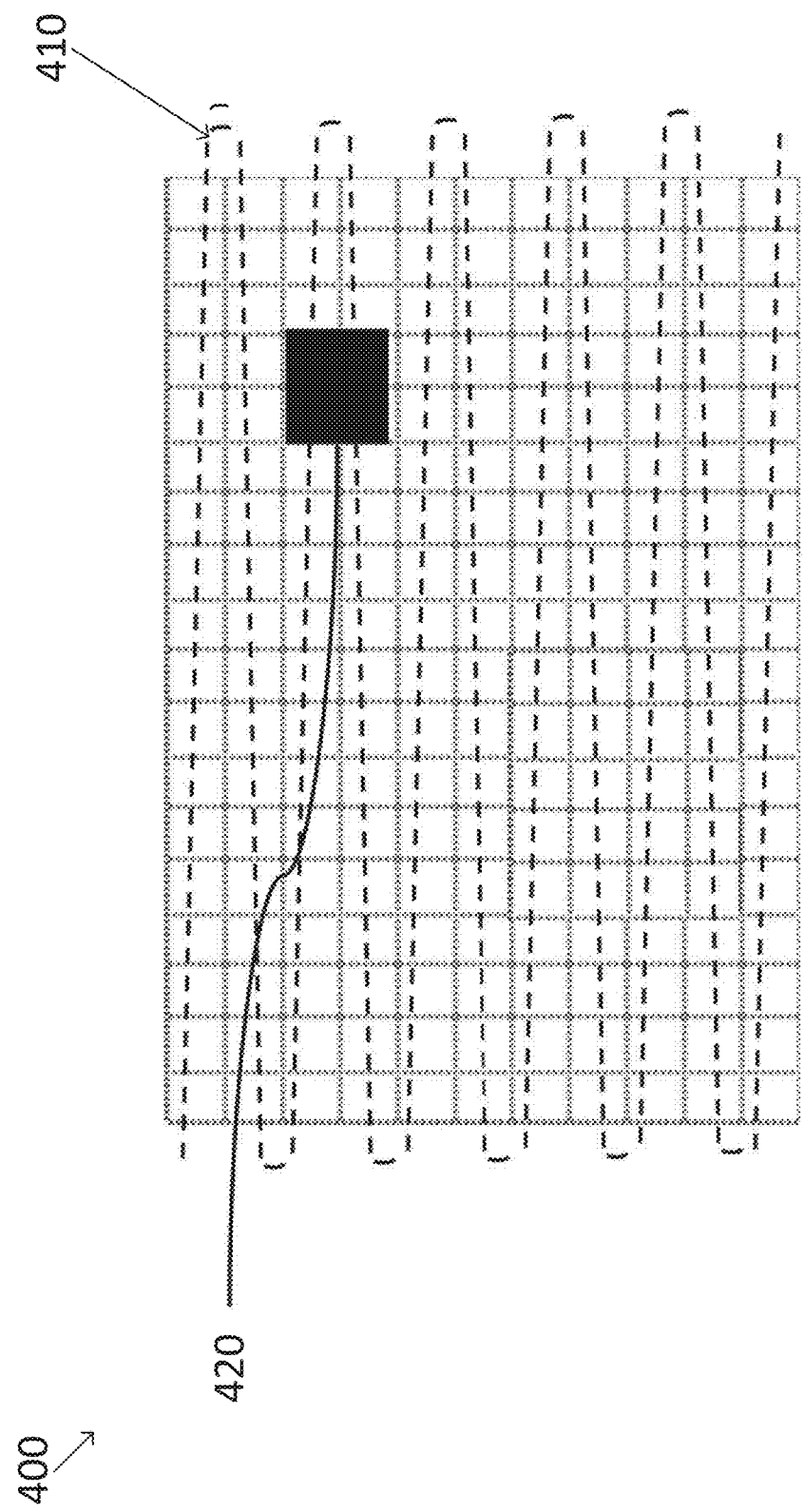
FIGS. 4A through 4D illustrate procedures in an example gaze tracking operation, according to some embodiments.

FIG. 4A illustrates an example scanning pattern of infrared light being scanned over the full scanning range 410 of the scanning mirror, where the scanning mirror is capable of rendering an image anywhere on the reflective surface, where the reflective surface is larger than a viewable region of the scanning surface. As illustrated, the scanning mirror is configured to move in the x and y directions, with scanning position 420 moving over the full scanning range 410 according to the scanning pattern, with scanning position 420 illustrating a position of the scanning pattern at one point in time.

The infrared light projected onto the reflective surface using the scanning mirror is reflected off of the user's eye, and the reflected infrared light is received at at least one infrared sensor for measuring the amount of infrared light at locations over the full scanning range 410.

Figure 4B:
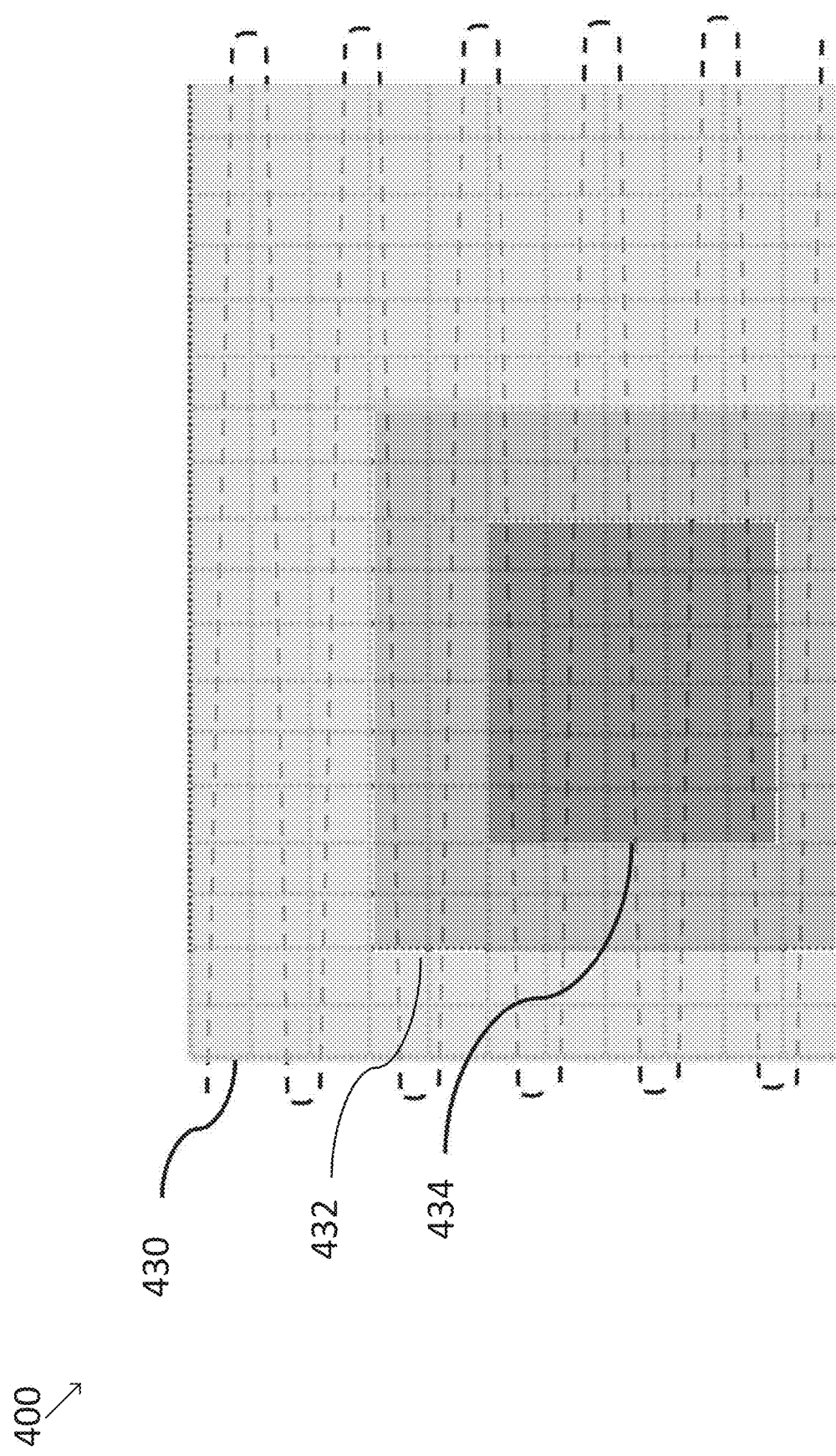

FIG. 4B illustrates an example mapping of intensity of the reflected infrared light over the scanning range of the scanning mirror as sensed by the at least one infrared sensor. Due to the reflective properties of different parts of the human eye, the mapping of intensity of the reflected light is indicative of the gaze direction of the user. As illustrated, the mapping of intensity of the reflected light includes three scanning regions 430, 432, and 434 of the full scanning range of the scanning mirror, with scanning region 430 exhibiting the highest amount of reflectivity and scanning region 434 exhibiting the lowest amount of reflectivity, with scanning region 432 exhibiting an amount of reflectivity between the amounts of scanning regions 430 and 434. For instance, scanning region 430 is associated with infrared light reflecting off of the sclera, scanning region 432 is associated with infrared light reflecting off of the iris, and scanning region 434 associated with infrared light reflecting off of the pupil. As such, it can be determined that scanning region 434 is indicative of the gaze direction of the user. While rectangular shapes of scanning regions 430, 432, and 434 are shown, it should be appreciated that scanning regions 430, 432, and 434 can have any shape or form factor.

Figure 4C:
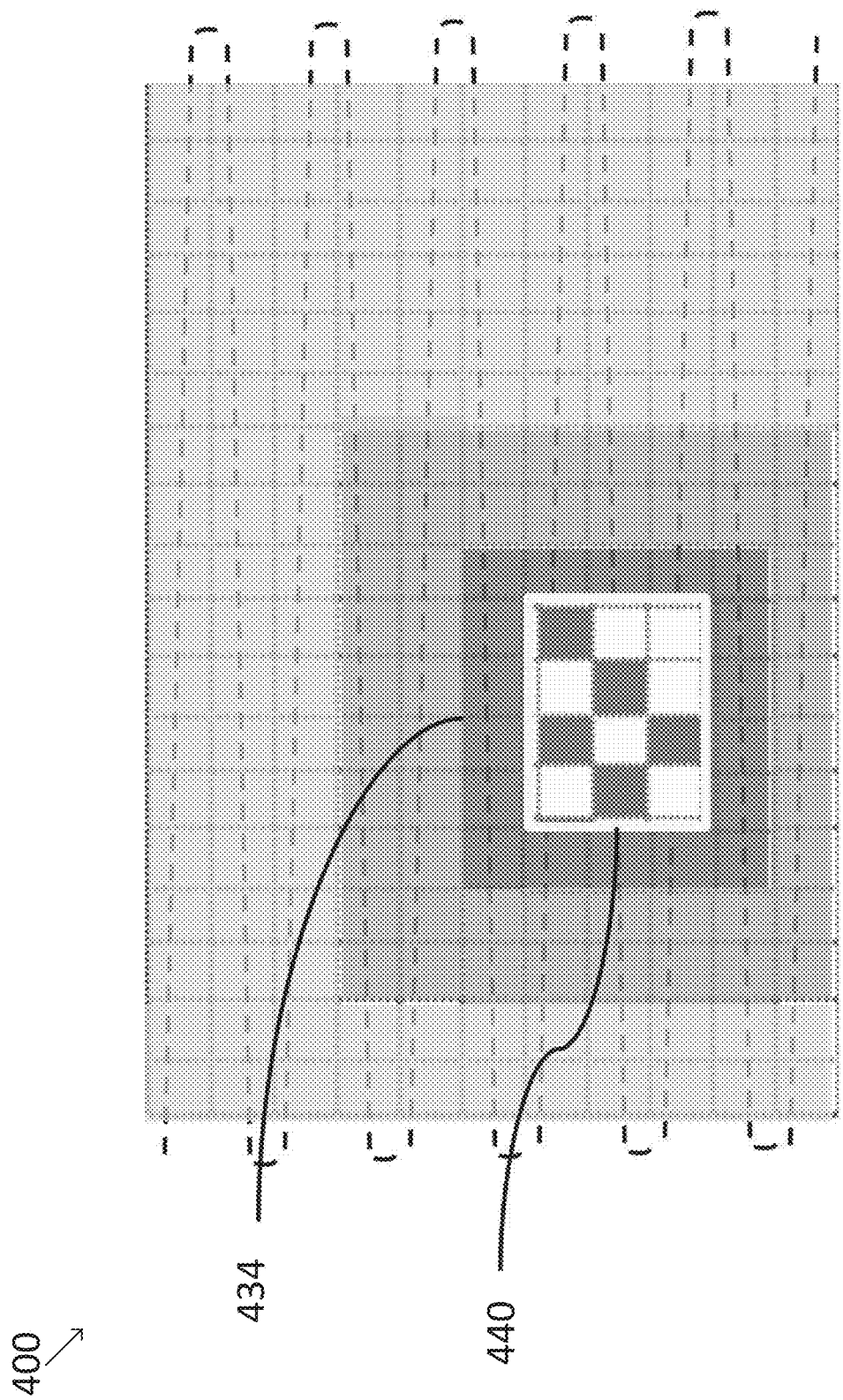

FIG. 4C illustrates an example projection of a visible image 440 onto scanning region 434 which identifies the gaze direction of the user, according to embodiments. As scanning region 434 exhibits the lowest reflectivity over the scanning range of the scanning mirror, it is determined that scanning region 434 identifies the gaze direction of the user. Accordingly, visible region 440 is projected onto scanning region 434 for ultimate projection into the user's pupil and onto the user's retina. It should be appreciated that FIG. 4C illustrates the example where the infrared light source and the visible light source(s) are fully aligned and not displaced.

Figure 4D:
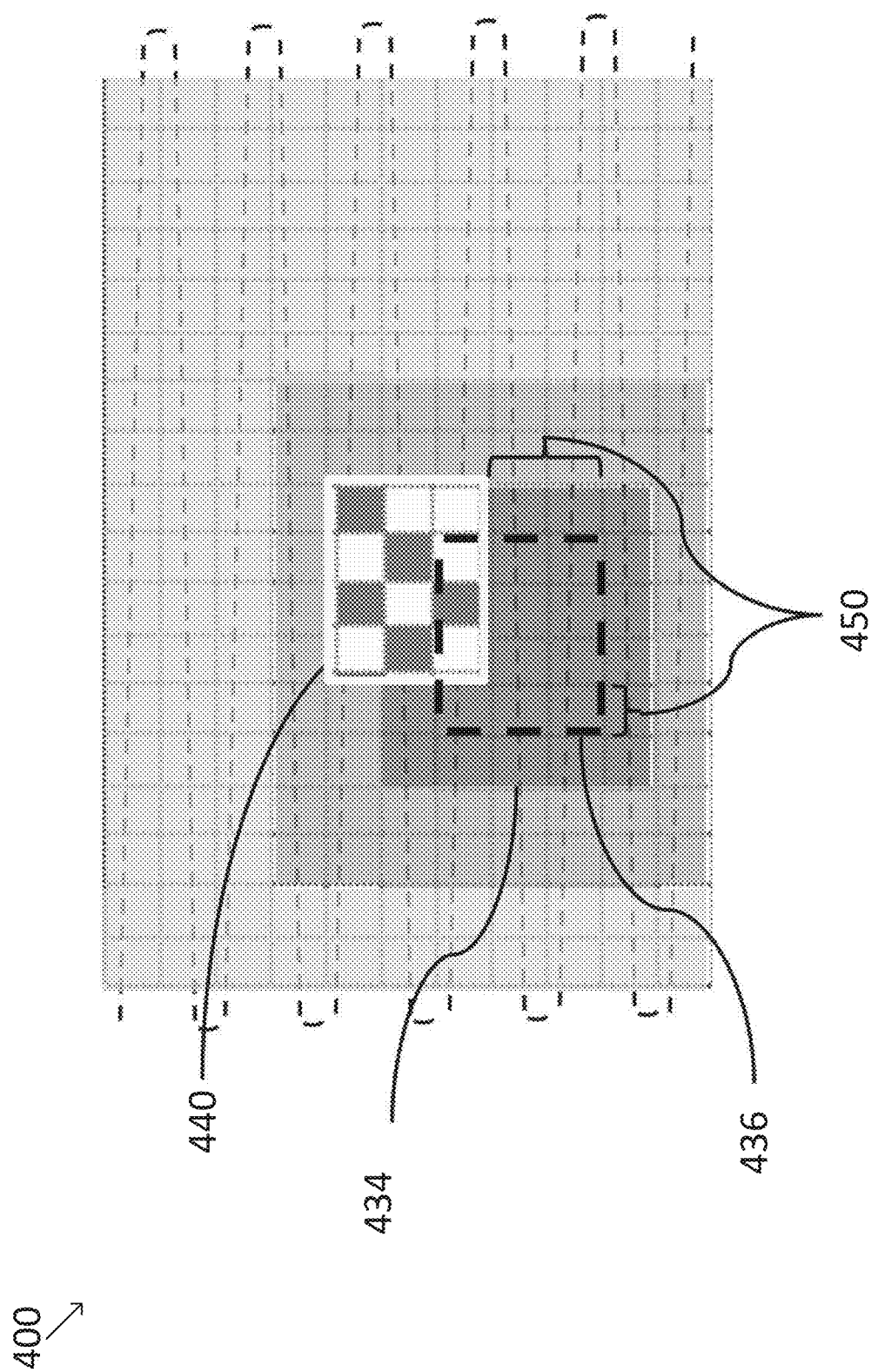

FIG. 4D illustrates an example projection of a visible image 440 onto a scanning mirror where the infrared light source and the visible light source(s) are not in alignment and are displaced relative to each other. As illustrated, region 436 is identified as the viewable region of the user, as described in accordance with FIGS. 4A through 4C. Since the infrared light source and the visible light source(s) are not in alignment, visible image 440, prior to adjustment, is not fully projected within region 436.

In some embodiments, the retinal projection display system is configured to compensate for displacement 450 between the at least one visible light source and the infrared light source to determine the gaze direction and to project the visible light image onto region 436. In some embodiments, the pupillary distance alignment is used to compensate for displacement 450. Since the pupillary distance alignment for the user identifies the viewable region of the reflective surface for a known gaze direction of the user, it can be used to coordinate operation of the scanning mirror to move visible image 440 to correspond to region 436 of the reflective surface, compensating for displacement 450.

In some embodiments, to avoid jitter of the viewable image, the viewable region (e.g., region 436) is only moved if sufficient movement of the gaze direction is detected (e.g., a movement threshold is satisfied). In some embodiments, jitter is accounted for by providing a rendered image smaller than the viewable region, such that the viewable region is moved responsive to the gaze direction of the user moving outside of the viewable region. This allows the image to be viewed over a larger range of positions and minimizes jitter. In some embodiments, to avoid image smearing, the viewable region is moved according to the gaze direction of the user after a predetermined time delay after the change in gaze direction, allowing the user's eye to settle in the new gaze direction prior to moving the image.

With reference to FIG. 2A, scanning mirror 220 projects image 215 (e.g., pixel by pixel) onto a viewable region of reflective surface 240 such that image 215 is projected into a retina of a user. In some embodiments, a scanning range of scanning mirror 220 is dynamically adjusted to correspond to a size of the image in the viewable region. In other embodiments, a scanning range of scanning mirror 220 corresponds to a size of a display area of reflective surface 240, such that light source 210 is activated for displaying the image only when scanning mirror 220 is projecting the image in the viewable region of reflective surface 240.

FIGS. 5A and 5B illustrates an example image rendering operation 500 where the scanning range of the scanning mirror is the size of the projected image, according to an embodiment. FIG. 5A illustrates an example scanning pattern over the full scanning range 510 of the scanning mirror, where the scanning mirror is capable of rendering an image anywhere on the reflective surface, where the reflective surface is larger than a viewable region of the scanning surface. As illustrated, the scanning mirror is configured to move in the x and y directions, with center position 520 being the identified gaze direction of the user and the center position of the viewable region. Eye tracking is used to identify center position of the viewable region.

FIG. 5B illustrates an example scanning pattern where the scanning range of the scanning mirror is the size of the projected image. As illustrated in FIG. 5B, center position 530 is identified using gaze tracking, where center position 530 is moved relative to center position 520. The scanning mirror panning angles are controlled so that the x and y scanning range 550 covers the viewable region 540 as identified by center position B. In the illustrated embodiment, scanning range 550 of the scanning mirror is reduced to the cover viewable region 540 of the reflective surface rather than the entire reflective surface. In some embodiments, infrared reflections are measured by infrared sensors over this reduced scanning range to ensure proper alignment with user's pupil which has low reflectivity. If reflectivity higher than certain threshold is measured, the scanning pattern is widened and gaze tracking operation as illustrated in FIGS. 4A and 4B is resumed to track the new gaze.

Figure 6:
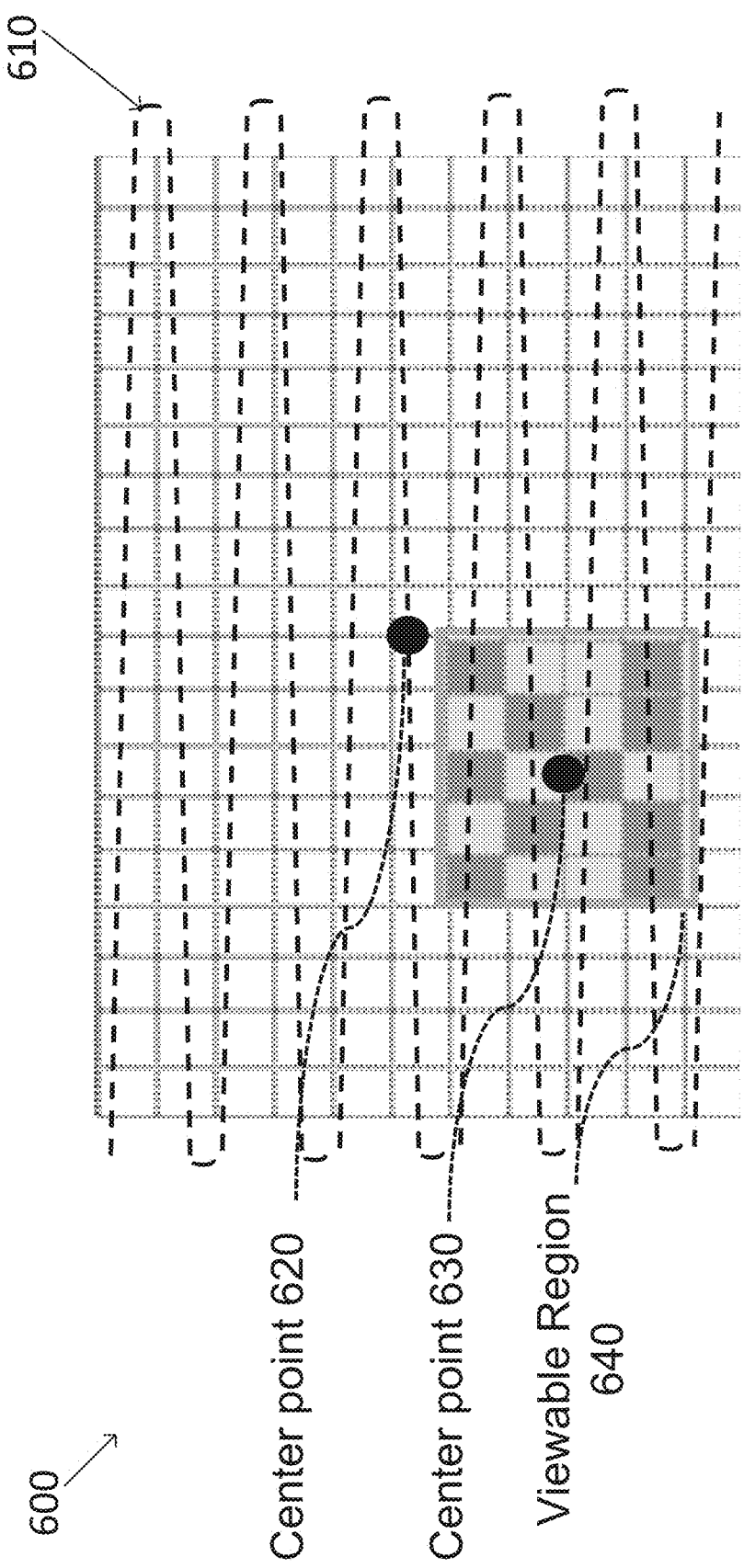
FIG. 6 illustrates an example image rendering operation where the scanning range of the scanning mirror is larger than the size of the projected image, according to an embodiment.

FIG. 6 illustrates an example image rendering operation 600 where the scanning range 610 of the scanning mirror is larger than the size of the projected image, according to an embodiment. As illustrated, the scanning mirror is configured to move in the x and y directions, with center position 620 being the identified gaze direction of the user and the center position of the viewable region. Eye tracking is used to identify center position of the viewable region.

As illustrated in FIG. 6, center position 630 is identified using gaze tracking, where center position 630 is moved relative to center position 620. Depending on gaze direction according to center position 630, the light source is only activated when the scanning mirror is within viewable region 640. The scanning mirror panning angles are controlled so that the x and y scanning range 610 covers the entire reflective surface area, but only activates the light source when the scanning mirror is within viewable region 640.

Figure 7:
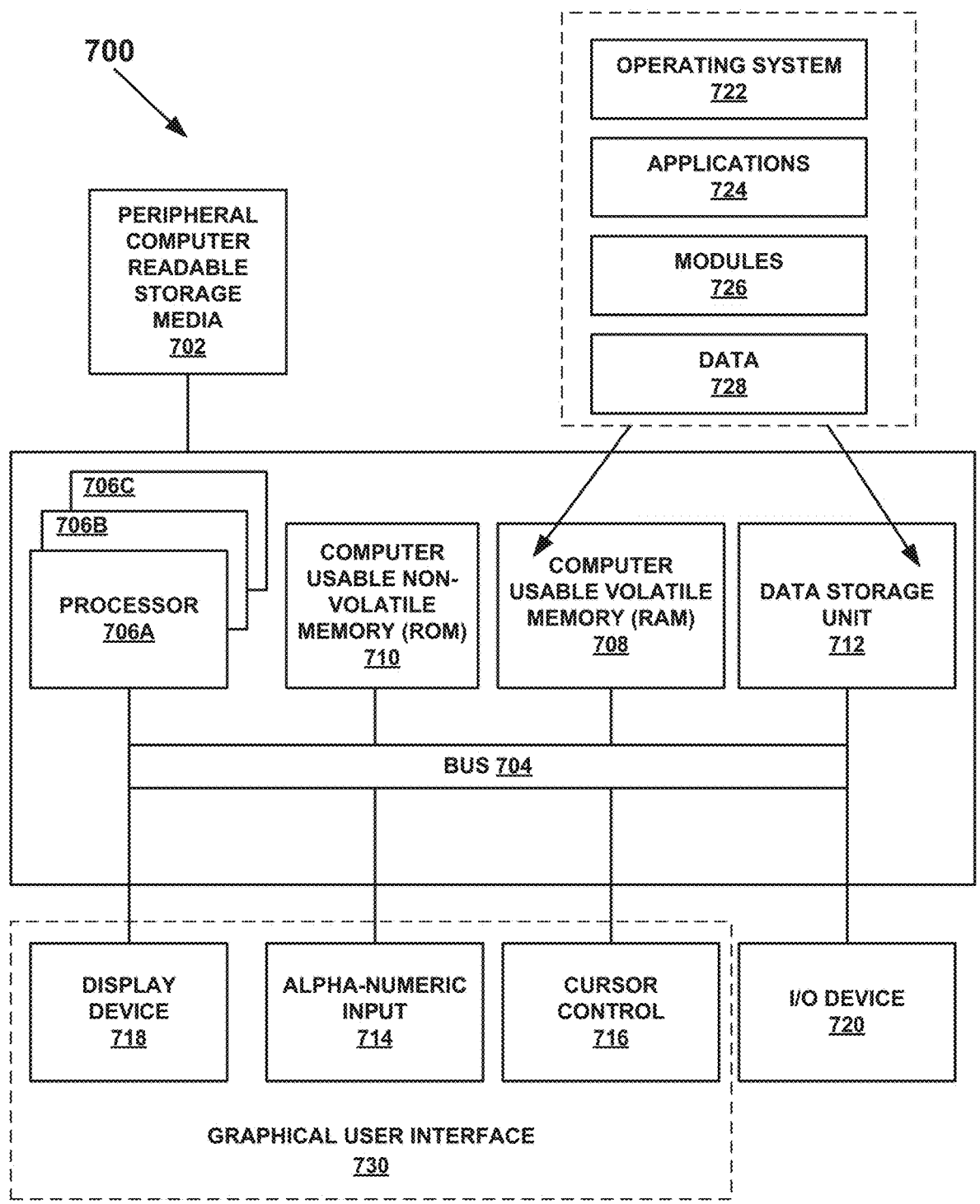
FIG. 7 is a block diagram of an example electronic device upon which embodiments described herein may be implemented.

FIG. 7 is a block diagram of an example electronic device 700 upon which embodiments of the present invention can be implemented. FIG. 7 illustrates one example of a type of electronic device 700 (e.g., a computer system) that can be used in accordance with or to implement various embodiments which are discussed herein. It should be appreciated that embodiments of the described retinal projection display system can be implemented using example electronic device 700.

It is appreciated that electronic device 700 of FIG. 7 is only an example and that embodiments as described herein can operate on or within a number of different computer systems including, but not limited to, general purpose networked computer systems, embedded computer systems, mobile electronic devices, smart phones, server devices, client devices, various intermediate devices/nodes, stand-alone computer systems, media centers, handheld computer systems, multi-media devices, and the like. In some embodiments, electronic device 700 of FIG. 7 is well adapted to having peripheral tangible computer-readable storage media 702 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

Electronic device 700 of FIG. 7 includes an address/data bus 704 for communicating information, and a processor 706A coupled with bus 704 for processing information and instructions. Bus 704 may be any suitable bus or interface to include, without limitation, a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent.

As depicted in FIG. 7, electronic device 700 is also well suited to a multi-processor environment in which a plurality of processors 706A, 706B, and 706C are present. Conversely, electronic device 700 is also well suited to having a single processor such as, for example, processor 706A. Processors 706A, 706B, and 706C may be any of various types of microprocessors. Electronic device 700 also includes data storage features such as a computer usable volatile memory 708, e.g., random access memory (RAM), coupled with bus 704 for storing information and instructions for processors 706A, 706B, and 706C. Electronic device 700 also includes computer usable non-volatile memory 710, e.g., read only memory (ROM), coupled with bus 704 for storing static information and instructions for processors 706A, 706B, and 706C. Also present in electronic device 700 is a data storage unit 712 (e.g., a magnetic or optical disc and disc drive) coupled with bus 704 for storing information and instructions. Electronic device 700 also includes an alphanumeric input device 714 including alphanumeric and function keys coupled with bus 704 for communicating information and command selections to processor 706A or processors 706A, 706B, and 706C. Electronic device 700 also includes an cursor control device 716 coupled with bus 704 for communicating user input information and command selections to processor 706A or processors 706A, 706B, and 706C. In one embodiment, electronic device 700 also includes a display device 718 coupled with bus 704 for displaying information. Depending on the architecture, different bus configurations may be employed as desired. For example, additional buses may be used to couple the various components of electronic device 700, such as by using a dedicated bus between processor 706A and memory computer usable volatile memory 708 or computer usable non-volatile memory 710.

Referring still to FIG. 7, display device 718 of FIG. 7 may include a light source (e.g., light source 110 of FIG. 1A) for projecting image data onto a reflective surface. In other embodiments, display device 718 may be a liquid crystal device (LCD), light emitting diode display (LED) device, plasma display device, a touch screen device, or other display device suitable for creating graphic images and alphanumeric characters recognizable to a user. Cursor control device 716 allows the computer user to dynamically signal the movement of a visible symbol (cursor) on a display screen of display device 718 and indicate user selections of selectable items displayed on display device 718. Many implementations of cursor control device 716 are known in the art including a trackball, mouse, touch pad, touch screen, joystick or special keys on alphanumeric input device 714 capable of signaling movement of a given direction or manner of displacement. Alternatively, it will be appreciated that a cursor can be directed and/or activated via input from alphanumeric input device 714 using special keys and key sequence commands. Electronic device 700 is also well suited to having a cursor directed by other means such as, for example, voice commands. In various embodiments, alphanumeric input device 714, cursor control device 716, and display device 718, or any combination thereof (e.g., user interface selection devices), may collectively operate to provide a graphical user interface (GUI) 730 under the direction of a processor (e.g., processor 706A or processors 706A, 706B, and 706C). GUI 730 allows user to interact with electronic device 700 through graphical representations presented on display device 718 by interacting with alphanumeric input device 714 and/or cursor control device 716.

Electronic device 700 also includes an I/O device 720 for coupling electronic device 700 with external entities. For example, in one embodiment, I/O device 720 is a modem for enabling wired or wireless communications between electronic device 700 and an external network such as, but not limited to, the Internet. In one embodiment, I/O device 720 includes a transmitter. Electronic device 700 may communicate with a network by transmitting data via I/O device 720.

Referring still to FIG. 7, various other components are depicted for electronic device 700. Specifically, when present, an operating system 722, applications 724, modules 726, and data 728 are shown as typically residing in one or some combination of computer usable volatile memory 708 (e.g., RAM), computer usable non-volatile memory 710 (e.g., ROM), and data storage unit 712. In some embodiments, all or portions of various embodiments described herein are stored, for example, as an application 724 and/or module 726 in memory locations within RAM 708, computer-readable storage media within data storage unit 712, peripheral computer-readable storage media 702, and/or other tangible computer-readable storage media.

Example Operations for Operating a Retinal Projection Display System

Figure 8A:
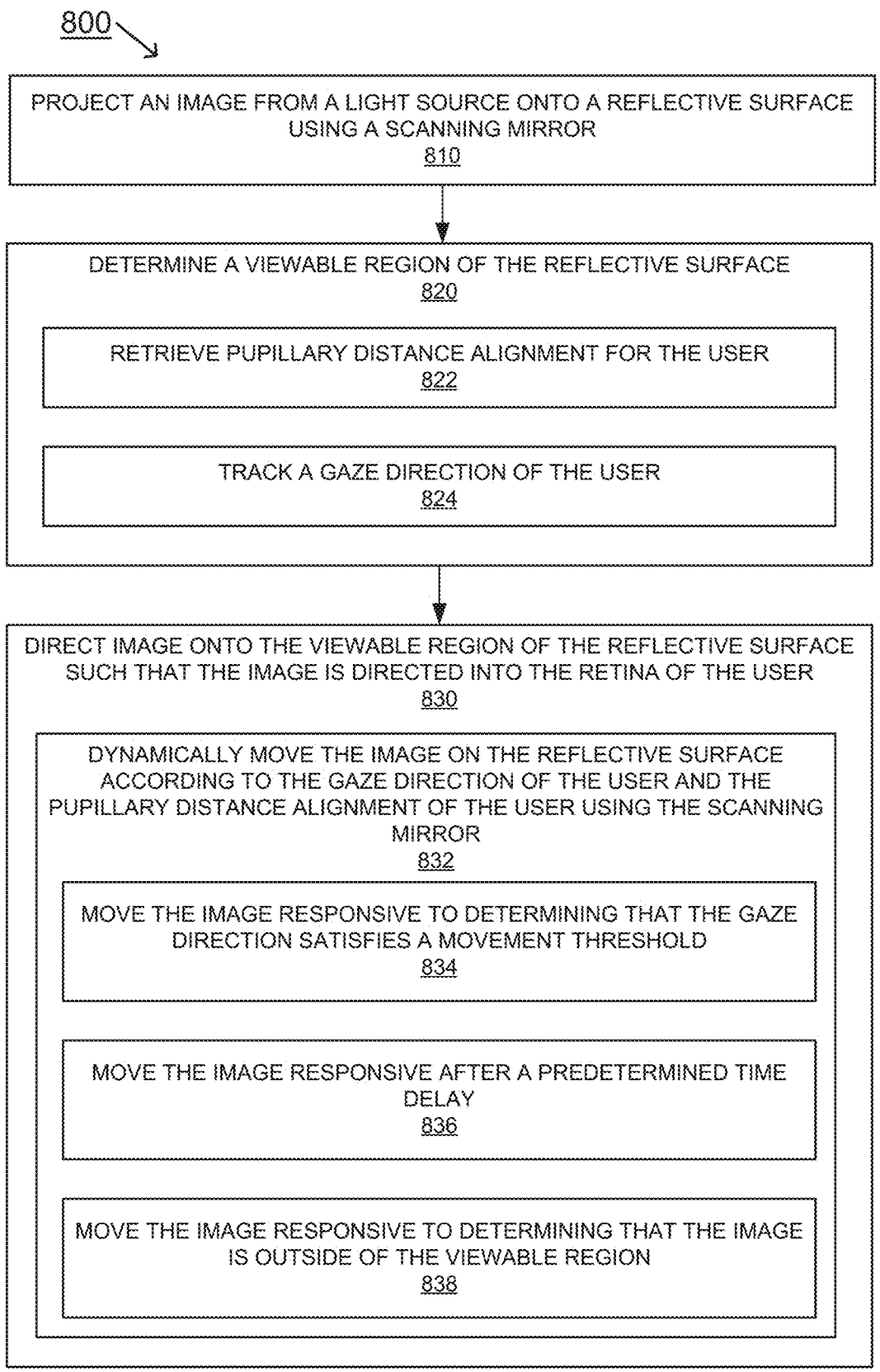
FIG. 8A illustrates an example process of retinal projection, according to some embodiments.
Figure 8B:
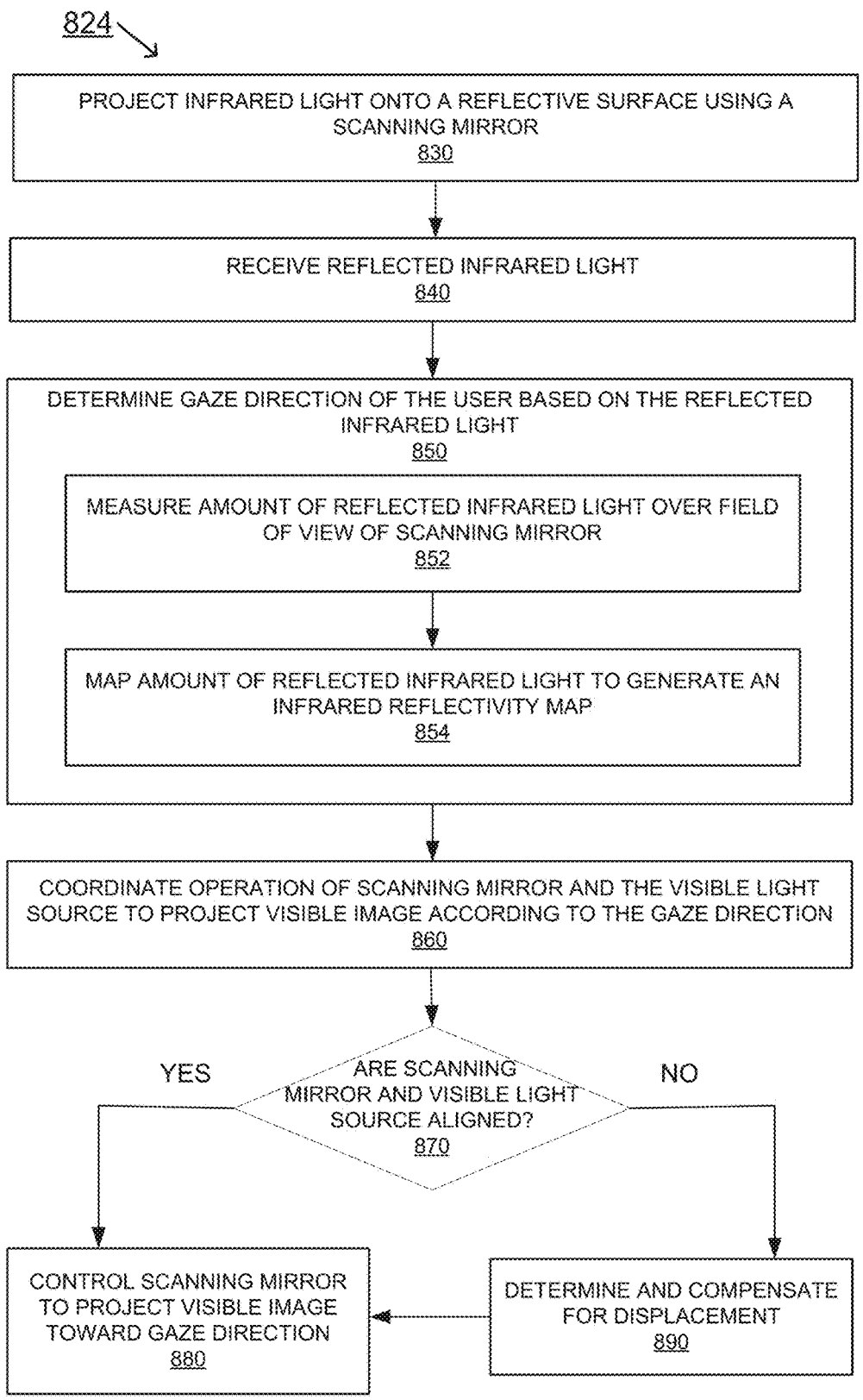
FIG. 8B illustrates an example process of gaze tracking, according to some embodiments.
Figure 9:
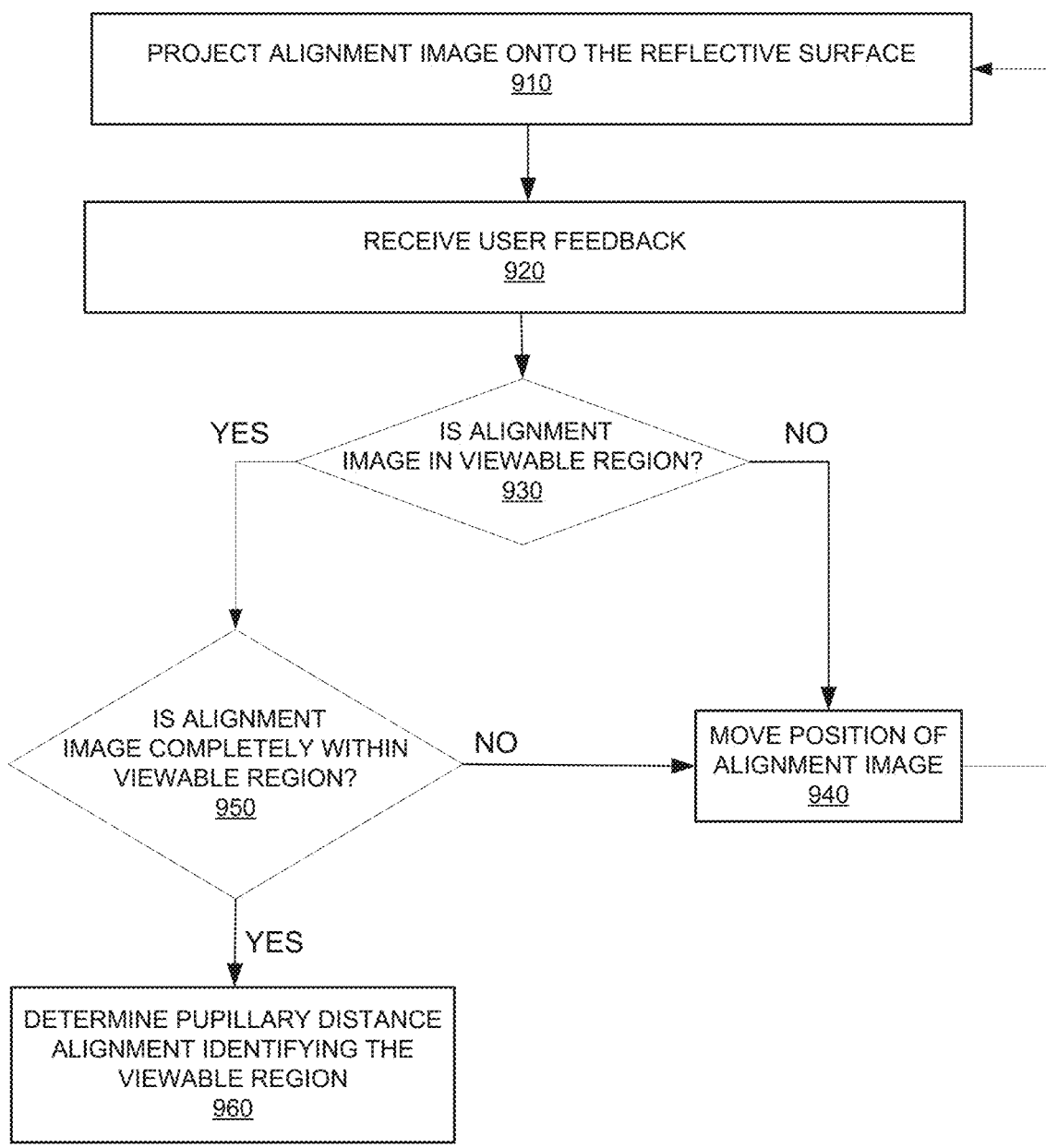
FIG. 9 illustrates an example process for determining a pupillary distance alignment, according to some embodiments.

FIG. 8A illustrates an example process of retinal projection, FIG. 8B illustrates an example process of gaze tracking, and FIG. 9 illustrates an example process for determining a pupillary distance alignment, according to some embodiments. Procedures of these methods will be described with reference to elements and/or components of various figures described herein. It is appreciated that in some embodiments, the procedures may be performed in a different order than described, that some of the described procedures may not be performed, and/or that one or more additional procedures to those described may be performed. The flow diagrams include some procedures that, in various embodiments, are carried out by one or more processors (e.g., a host processor or a sensor processor) under the control of computer-readable and computer-executable instructions that are stored on non-transitory computer-readable storage media. It is further appreciated that one or more procedures described in the flow diagrams may be implemented in hardware, or a combination of hardware with firmware and/or software.

With reference to FIG. 8A, flow diagram 800 illustrates an example process of retinal projection, according to some embodiments. At procedure 810 of flow diagram 800, an image from a light source is projected onto a reflective surface using a scanning mirror having a field of view larger than the image, where the reflective surface is larger than the image. In some embodiments, the light source includes a plurality of visible light sources, and wherein a visible light source displacement between the plurality of visible light sources is determined during a manufacturing calibration operation and stored in a memory unit. In some embodiments, the plurality of visible light sources is aligned based at least in part on the visible light source displacement. In some embodiments, a scanning range of the scanning mirror is dynamically adjusted to correspond to a size of the image in the viewable region. In some embodiments, a scanning range of the scanning mirror corresponds to a size of display area of the reflective surface, such that the light source is activated for displaying the image only when the scanning mirror is projecting the image in the viewable region. In some embodiments, the reflective surface is at least partially transparent.

At procedure 820, a viewable region of the reflective surface for a user is determined. In some embodiments, as shown at procedure 822, a pupillary distance alignment for the user is retrieved (e.g., from memory), wherein the pupillary distance alignment identifies the viewable region of the reflective surface for a known gaze direction of the user. In some embodiments, as shown at procedure 824, a gaze direction of the user is tracked, wherein the viewable region corresponds to the gaze direction.

In some embodiment, procedure 824 is performed according to flow diagram 824 of FIG. 8B. FIG. 8B illustrates a flow diagram 824 of an example process of gaze tracking, according to some embodiments. At procedure 830 of flow diagram 824, infrared light from an infrared light source is projected onto the reflective surface using the scanning mirror, where the infrared light is projected over the field of view of the scanning mirror and reflected off the reflective surface at least partially towards an eye of a user. At procedure 840, reflected infrared light that reflects off of the eye of the user is received at at least one infrared photodetector.

At procedure 850, a gaze direction of the user is determined based at least in part on the reflected infrared light. In one embodiment, as shown at procedure 852, an amount of the reflected infrared light over the field of view of the scanning mirror on the reflective surface is measured. At procedure 854, the amount of the reflected infrared light over the field of view of the scanning mirror on the reflective surface is mapped to generate an infrared reflectivity map of the field of view of the scanning mirror, where the infrared reflectivity map identifies the gaze direction.

At procedure 860, operation of scanning mirror and the at least one visible light source for projecting the visible light image onto the reflective surface is coordinated based on the gaze direction such that the visible light image is projected into a retina of the user. In one embodiment, at procedure 870, it is determined whether the at least one visible and the infrared light source are in alignment. Provided the at least one visible and the infrared light source are in alignment, as shown at procedure 880, the scanning mirror is controlled to project the visible light image onto the reflective surface toward the gaze direction.

Provided the at least one visible and the infrared light source are not in alignment, as shown at procedure 890, displacement between the at least one visible light source and the infrared light source is determined and the displacement is compensated for so that the visible light image is projected onto the reflective surface toward the gaze direction. In some embodiments, the displacement is determined by retrieving a pupillary distance alignment for the user, wherein the pupillary distance alignment identifies a viewable region of the reflective surface for a known gaze direction of the user, and where the displacement between the at least one visible light source and the infrared light source is based at least in part on the gaze direction and the pupillary distance alignment. In other embodiments, the displacement is determined by retrieving the displacement between the at least one visible light source and the infrared light source, where the displacement between the at least one visible light source and the infrared light source is determined during a manufacturing calibration operation and stored in a memory unit.

Returning to FIG. 8A, at procedure 830, the image is directed onto the viewable region of the reflective surface such that the image is projected into a retina of the user. In some embodiments, as shown at procedure 832, the image is dynamically moved on the reflective surface according to the gaze direction of the user and the pupillary distance alignment of the user using the scanning mirror.

In some embodiments, as shown at procedure 834, an amount of movement of the gaze direction is determined based on tracking the gaze direction of the user and, responsive to the amount of movement of the gaze direction satisfying a movement threshold, the image is moved on the reflective surface according to the gaze direction of the user and the pupillary distance alignment of the user. In some embodiments, as shown at procedure 836, the image is moved on the reflective surface according to the gaze direction of the user and the pupillary distance alignment of the user after a predetermined time delay. In some embodiments, as shown at procedure 838, responsive to determining that the image is outside of the viewable region, the image is moved on the reflective surface according to the gaze direction of the user and the pupillary distance alignment of the user.

FIG. 9 illustrates an example flow diagram 900 for determining a pupillary distance alignment, e.g., during a calibration operation, according to some embodiments. At procedure 910 of flow diagram 900, an alignment image is projected onto the reflective surface. At procedure 920, user feedback is received regarding the viewability of the alignment image while the user is gazing in a known gaze direction. At procedure 930, it is determined whether the alignment image is in the viewable region according to the user feedback. If the alignment image is not in the viewable region, flow diagram 900 proceeds to procedure 940. At procedure 940, the position of the alignment image is moved on the reflective surface to another position. If the alignment image is within in the viewable region, flow diagram 900 proceeds to procedure 950.

At procedure 950, it is determined whether the alignment image is completely within the viewable region according to the user feedback. If the alignment image is not completely within the viewable region, flow diagram 900 proceeds to procedure 940. At procedure 940, the position of the alignment image is moved on the reflective surface to another position. If the alignment image is completely within in the viewable region, flow diagram 900 proceeds to procedure 960. At procedure 960, the pupillary distance alignment identifying the viewable region of the reflective surface for the known gaze direction of the user is determined. In some embodiments, the pupillary distance alignment is stored (e.g., in memory) for retrieval during retinal projection display operation.

CONCLUSION

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. Many aspects of the different example embodiments that are described above can be combined into new embodiments. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A retinal projection display system comprising:
   at least one visible light source for projecting a visible light image;
   an infrared light source for projecting infrared light;
   a scanning mirror having a field of view larger than the visible light image;
   a reflective surface on which the visible light image is projected and on which the infrared light is reflected at least partially towards an eye of a user, wherein the reflective surface is larger than the visible light image, wherein the visible light image is projected onto the reflective surface using a first scanning pattern and the infrared light is projected onto the reflective surface using a second scanning pattern, and wherein the first scanning pattern and the second scanning pattern are different scanning patterns;
   at least one infrared photodetector for receiving reflected infrared light that reflects off of the eye of the user; and
   a hardware computation module comprising a processor and a memory, the hardware computation module configured to determine a gaze direction of the user based at least in part on the reflected infrared light, the hardware computation module further configured to coordinate operation of scanning mirror and the at least one visible light source for projecting the visible light image onto the reflective surface using the first scanning pattern based on the gaze direction such that the visible light image is directed through a pupil and projected onto a retina of the user.

2. The retinal projection display system of claim 1, wherein the at least one visible light source and the infrared light source are in alignment, such that the hardware computation module is further configured to control the scanning mirror to project the visible light image onto the reflective surface toward the gaze direction.

3. The retinal projection display system of claim 1, wherein the at least one visible light source and the infrared light source are not in alignment, such that the hardware computation module is further configured to control the scanning mirror to compensate for displacement between the at least one visible light source and the infrared light source to determine the gaze direction and to project the visible light image onto the reflective surface toward the gaze direction.

4. The retinal projection display system of claim 3, wherein a pupillary distance alignment is determined during a calibration operation for the user, wherein the pupillary distance alignment identifies a viewable region of the reflective surface for a known gaze direction of the user.

5. The retinal projection display system of claim 4, wherein the displacement between the at least one visible light source and the infrared light source is based at least in part on the gaze direction and the pupillary distance alignment.

6. The retinal projection display system of claim 3, wherein the displacement between the at least one visible light source and the infrared light source is determined during a manufacturing calibration operation and stored in the memory.

7. The retinal projection display system of claim 1, wherein the at least one visible light source comprises a plurality of visible light sources, and wherein a visible light source displacement between the plurality of visible light sources is determined during a manufacturing calibration operation and stored in the memory.

8. The retinal projection display system of claim 7, wherein the hardware computation module is configured to align the plurality of visible light sources based at least in part on the visible light source displacement.

9. The retinal projection display system of claim 1, wherein the hardware computation module is further configured to:
   scan the infrared light over the field of view of the reflective surface;
   receive reflected infrared light that reflects off of the eye of the user at the at least one infrared photodetector;
   measure an amount of the reflected infrared light over the field of view of the scanning mirror on the reflective surface; and
   map the amount of the reflected infrared light over the field of view of the scanning mirror on the reflective surface to generate an infrared reflectivity map of the field of view of the scanning mirror, wherein the infrared reflectivity map identifies the gaze direction.

10. The retinal projection display system of claim 1, wherein the reflective surface is at least partially transparent.

11. The retinal projection display system of claim 1, further comprising:
    an eyeglasses frame configured to be worn by the user; and
    at least one lens mounted in the eyeglasses frame, where the reflective surface is positioned on at least a portion of the at least one lens.

12. The retinal projection display system of claim 11, wherein the at least one infrared photodetector is positioned on the eyeglasses frame.

13. The retinal projection display system of claim 11, wherein the at least one infrared photodetector is positioned inside a module comprising the at least one visible light source and the infrared light source.

14. A method of retinal projection display, the method comprising:
    projecting a visible light image from at least one visible light source onto a reflective surface using a scanning mirror having a field of view larger than the visible light image, wherein the reflective surface is larger than the visible light image, wherein the visible light image is projected onto the reflective surface using a first scanning pattern;
    projecting infrared light from an infrared light source onto the reflective surface using the scanning mirror, wherein the infrared light is projected over the field of view of the scanning mirror and reflected off the reflective surface at least partially towards an eye of a user, wherein the infrared light is projected onto the reflective surface using a second scanning pattern, and wherein the first scanning pattern and the second scanning pattern are different scanning patterns;

receiving reflected infrared light that reflects off of the eye of the user at at least one infrared photodetector;

determining a gaze direction of the user based at least in part on the reflected infrared light; and coordinating operation of scanning mirror and the at least one visible light source for projecting the visible light image onto the reflective surface using the first scanning pattern based on the gaze direction such that the visible light image is directed through a pupil and projected onto a retina of the user.

15. The method of claim 14, wherein the at least one visible light source and the infrared light source are in alignment, the method further comprising:

controlling the scanning mirror to project the visible light image onto the reflective surface toward the gaze direction.

16. The method of claim 14, wherein the at least one visible light source and the infrared light source are not in alignment, the method further comprising:

determining displacement between the at least one visible light source and the infrared light source; and controlling the scanning mirror to compensate for the displacement between the at least one visible light source and the infrared light source to determine the gaze direction and to project the visible light image onto the reflective surface toward the gaze direction.

17. The method of claim 16, wherein the determining the displacement between the at least one visible light source and the infrared light source comprises:

retrieving a pupillary distance alignment for the user, wherein the pupillary distance alignment identifies a viewable region of the reflective surface for a known gaze direction of the user, and wherein the displacement between the at least one visible light source and the infrared light source is based at least in part on the gaze direction and the pupillary distance alignment.

18. The method of claim 16, wherein the determining the displacement between the at least one visible light source and the infrared light source comprises:

retrieving the displacement between the at least one visible light source and the infrared light source, wherein the displacement between the at least one visible light source and the infrared light source is determined during a manufacturing calibration operation and stored in a memory unit.

19. The method of claim 14, wherein the at least one visible light source comprises a plurality of visible light sources, and wherein a visible light source displacement between the plurality of visible light sources is determined during a manufacturing calibration operation and stored in a memory unit.

20. The method of claim 19, the method further comprising:

aligning the plurality of visible light sources based at least in part on the visible light source displacement.

21. The method of claim 14, wherein the determining a gaze direction of the user based at least in part on the reflected infrared light comprises:

measuring an amount of the reflected infrared light over the field of view of the scanning mirror on the reflective surface; and mapping the amount of the reflected infrared light over the field of view of the scanning mirror on the reflective surface to generate an infrared reflectivity map of the field of view of the scanning mirror, wherein the infrared reflectivity map identifies the gaze direction.

* * * * *